United States Patent
Ronen et al.

(10) Patent No.: US 8,095,911 B2
(45) Date of Patent: Jan. 10, 2012

(54) METHOD AND SYSTEM FOR UTILIZING DEVELOPMENT COMPONENTS

(75) Inventors: Benzi Ronen, Savion (IL); Nir Rostoker, San Francisco, CA (US)

(73) Assignee: SAP AG (DE)

( * ) Notice: Subject to any disclaimer, the term of this patent is extended or adjusted under 35 U.S.C. 154(b) by 962 days.

(21) Appl. No.: 11/396,143

(22) Filed: Mar. 31, 2006

(65) Prior Publication Data

US 2007/0234291 A1 Oct. 4, 2007

(51) Int. Cl.
*G06F 9/44* (2006.01)

(52) U.S. Cl. .......... 717/122; 717/120; 717/121

(58) Field of Classification Search .......... None
See application file for complete search history.

(56) References Cited

U.S. PATENT DOCUMENTS

| | | | |
|---|---|---|---|
| 6,427,230 B1 * | 7/2002 | Goiffon et al. | 717/108 |
| 6,621,505 B1 * | 9/2003 | Beauchamp et al. | 715/764 |
| 6,662,357 B1 * | 12/2003 | Bowman-Amuah | 717/120 |
| 6,738,964 B1 | 5/2004 | Zink et al. | |
| 6,839,724 B2 * | 1/2005 | Manchanda et al. | 1/1 |
| 6,847,963 B1 | 1/2005 | Paclat | |
| 6,901,414 B2 * | 5/2005 | West et al. | 1/1 |
| 6,957,334 B1 | 10/2005 | Goldstein et al. | |
| 6,975,849 B1 | 12/2005 | DeVries | |
| 7,035,786 B1 | 4/2006 | Abu El Ata et al. | |
| 7,062,705 B1 | 6/2006 | Kirkwood et al. | |
| 7,092,936 B1 | 8/2006 | Alonso et al. | |
| 7,131,112 B1 * | 10/2006 | Bartz et al. | 717/122 |
| 7,149,734 B2 * | 12/2006 | Carlson et al. | 707/6 |
| 7,587,502 B2 | 9/2009 | Crawford et al. | |
| 2002/0103789 A1 | 8/2002 | Turnbull et al. | |
| 2003/0005412 A1 * | 1/2003 | Eanes | 717/120 |
| 2003/0028451 A1 | 2/2003 | Ananian | |
| 2003/0046282 A1 | 3/2003 | Carlson et al. | |
| 2004/0158811 A1 | 8/2004 | Guthrie et al. | |
| 2004/0187140 A1 * | 9/2004 | Aigner et al. | 719/328 |
| 2004/0216088 A1 * | 10/2004 | Alcorn et al. | 717/116 |
| 2005/0204334 A1 | 9/2005 | Parthasarathy et al. | |
| 2005/0273758 A1 | 12/2005 | Long | |
| 2006/0004615 A1 | 1/2006 | Guldner et al. | |
| 2006/0085255 A1 | 4/2006 | Hastings et al. | |
| 2006/0230383 A1 * | 10/2006 | Moulckers et al. | 717/120 |
| 2006/0248504 A1 * | 11/2006 | Hughes | 717/101 |
| 2007/0006152 A1 * | 1/2007 | Ahmed et al. | 717/122 |

(Continued)

OTHER PUBLICATIONS

Lim, W. C. Legal and Contractual Issues in Software Reuse, Proceedings Fourth International Conference on Software Reuse, Apr. 1996, pp. 156-164, Retrieved on [Sep. 15, 2011] Retrieved from the Internet: URL<http://ieeexplore.ieee.org/stamp/stamp.jsp?tp=&arnumber=496123>.*

(Continued)

*Primary Examiner* — Thuy Dao
*Assistant Examiner* — Cheneca Smith
(74) *Attorney, Agent, or Firm* — Fish & Richardson P.C.

(57) ABSTRACT

Methods, systems, and software for utilizing development components or other enterprise content—whether developed internally or by third parties—are described herein. One method for utilizing reusable development components includes presenting an interface to a remote user operable to display information for at least a first and a second development component. In some cases, the first development component is a first type of enterprise application content and the second development component of a second type of enterprise application content. The user is then allowed to update some portion of metadata associated with the first development component.

20 Claims, 19 Drawing Sheets

U.S. PATENT DOCUMENTS

2007/0169045 A1  7/2007  Nallipogu et al.

OTHER PUBLICATIONS

Yao et al, Towards a Semantic-based Approach for Sofrtware Reusable Component Classification and Retrieval, Proceedings of the 42nd Southeast Regiolnal Conference, 2004, pp. 110-115 Retrieved from the Internet on [Sep. 15, 2011].*

Appexchange, material from Website, 9 pages, <http://www.salesforce.com>, site visited Mar. 31, 2006.

Jasik, Benji et al., "*Dreamforce 05, Getting the Most Our of Sforce Open Source*," Salesforce.com User & Developer Conference 2005, 36 pages <http://www.salesforce.com>, site visited Mar. 31, 2006.

Whitlock, Sarah T. et al., "*Dreamforce 05, Introduction to Sforce Web Services API*," Salesforce.com User & Developer Conference 2005, 39 pages <http://www.salesforce.com>, site visited Mar. 31, 2006.

Salesforce.com, "*Creating Applications with the AppExchange Platform*," copyright 2006, 6 pages <http://www.salesforce.com>, site visited Mar. 31, 2006.

salesforce.com, "*Installing Apps from the AppExchange*," Salesforce Winter '06, Copyright 2000-2006, 17 pages <http://www.salesforce.com>, site visited Mar. 31, 2006.

salesforce.com, "*Publishing Apps on the AppExchange*," Mar. 20, 2006, Copyright 2000-2006, 34 pages <http://www.salesforce.com>, site visited Mar. 31, 2006.

"*Value of the SAP Partner Ecosystem for the SAP NetWeaver™ Platform*," SAP Solution Brief, SAP NetWeaver, 2005, 4 pages <www.sap.com/solutions/netweaver>, site visited Mar. 31, 2006.

Amazon Material from Website, 3 pages <http://www.amazon.com>, site visited Mar. 31, 2006.

Del.icio.us Material from Website, 4 pages, del.icio.us, site visited Mar. 31, 2006.

"SourceForge.net," material from Website, 14 pages <http://www.sourceforge.net>, site visited Mar. 31, 2006.

Office Action issued in U.S. Appl. No. 11/396,484 on Dec. 11, 2009; 9 pages.

Office Action issued in U.S. Appl. No. 11/395,856 on Nov. 30, 2009; 7 pages.

Office Action issued in U.S. Appl. No. 11/396,156 on Apr. 1, 2010; 15 pages.

Office Action issued in U.S. Appl. No. 11/395,783 on May 13, 2010; 12 pages.

Office Action issued in U.S. Appl. No. 11/396,484 on Jul. 21, 2010; 12 pages.

Notice of Allowance issued in U.S. Appl. No. 11/395,856 on May 25, 2010; 7 pages.

Office Action issued in U.S. Appl. No. 11/395,783 on Sep. 16, 2010; 14 pages.

Office Action issued in U.S. Appl. No. 11/395,856 on Sep. 3, 2010; 10 pages.

Office Action issued in U.S. Appl. No. 11/396,156 on Sep. 16, 2010; 18 pages.

Office Action issued in U.S. Appl. No. 11/396,484 on May 25, 2011; 13 pages.

Notice of Allowance issued in U.S. Appl. No. 11/395,856 on May 13, 2011; 7 pages.

* cited by examiner

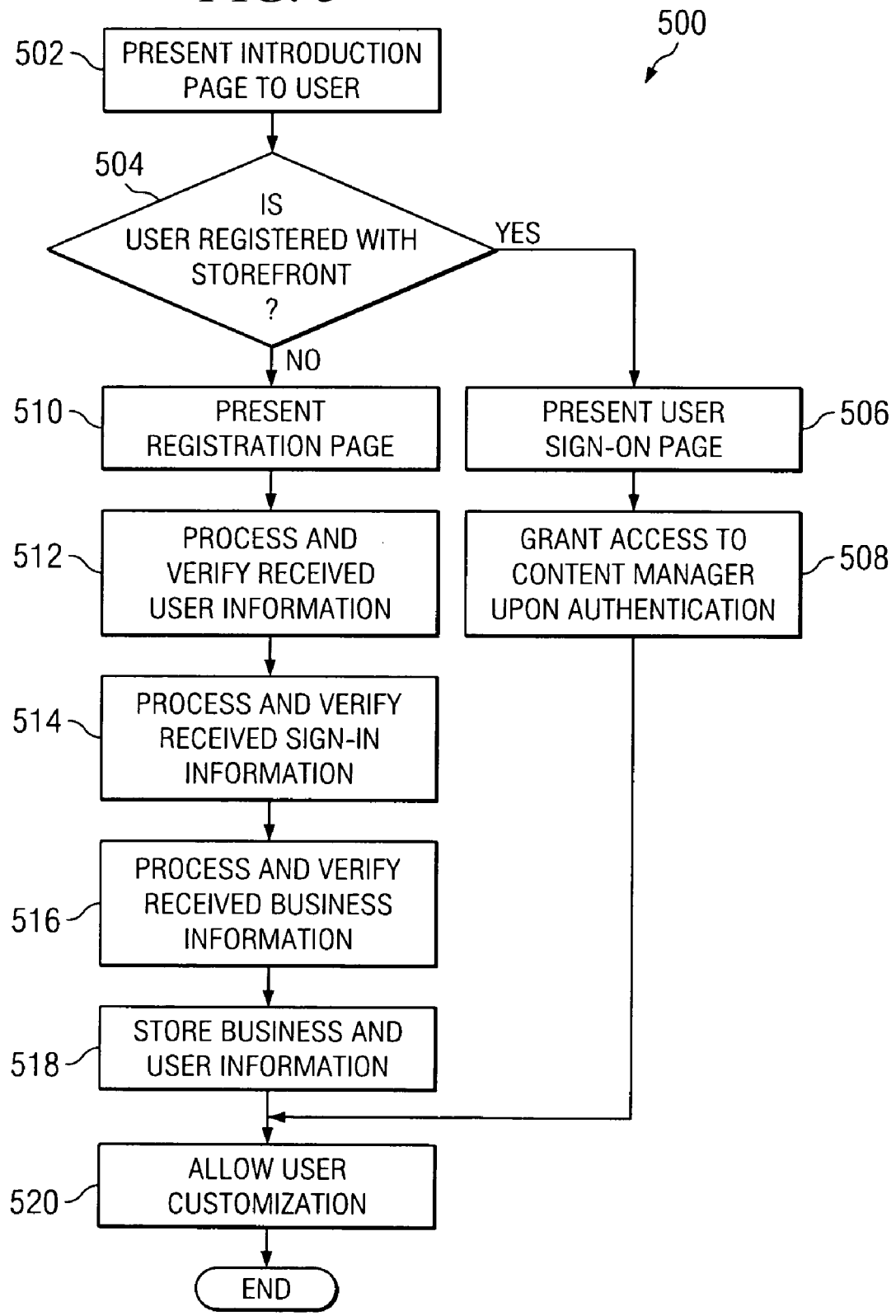

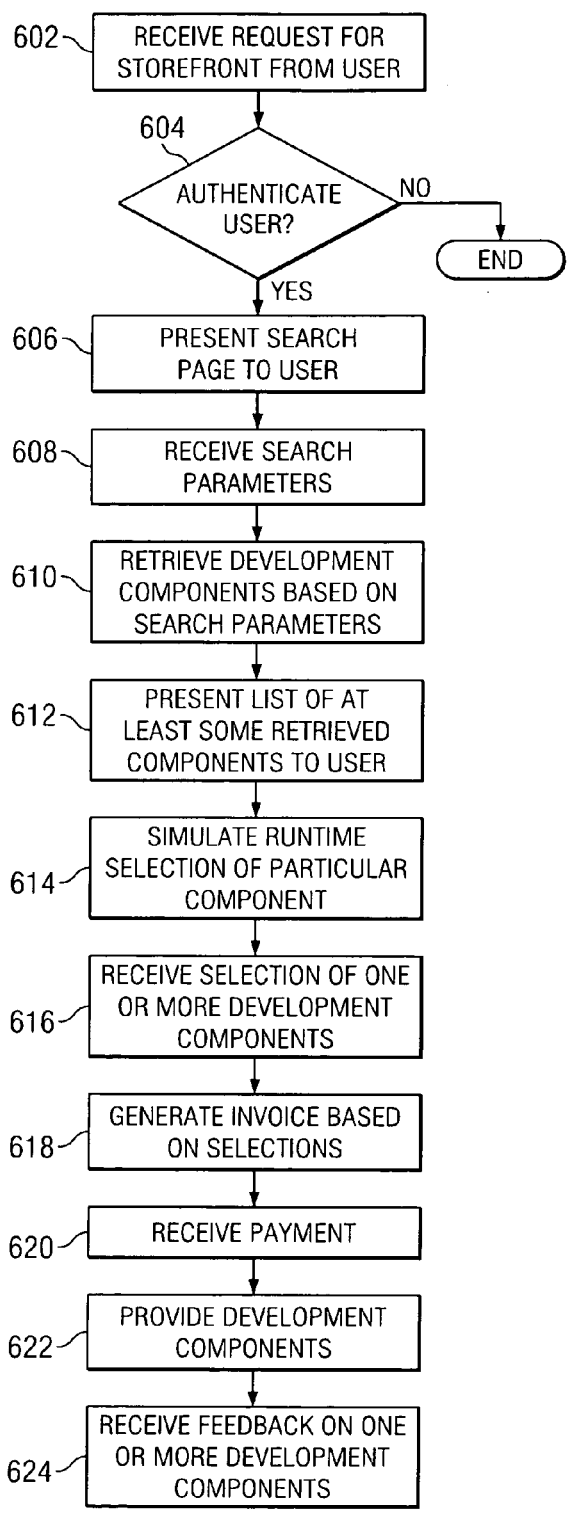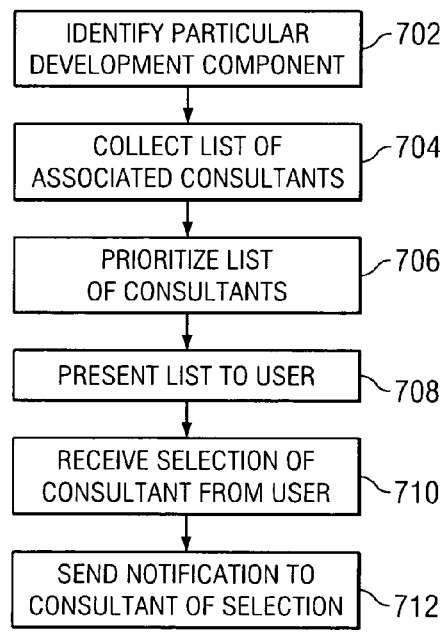

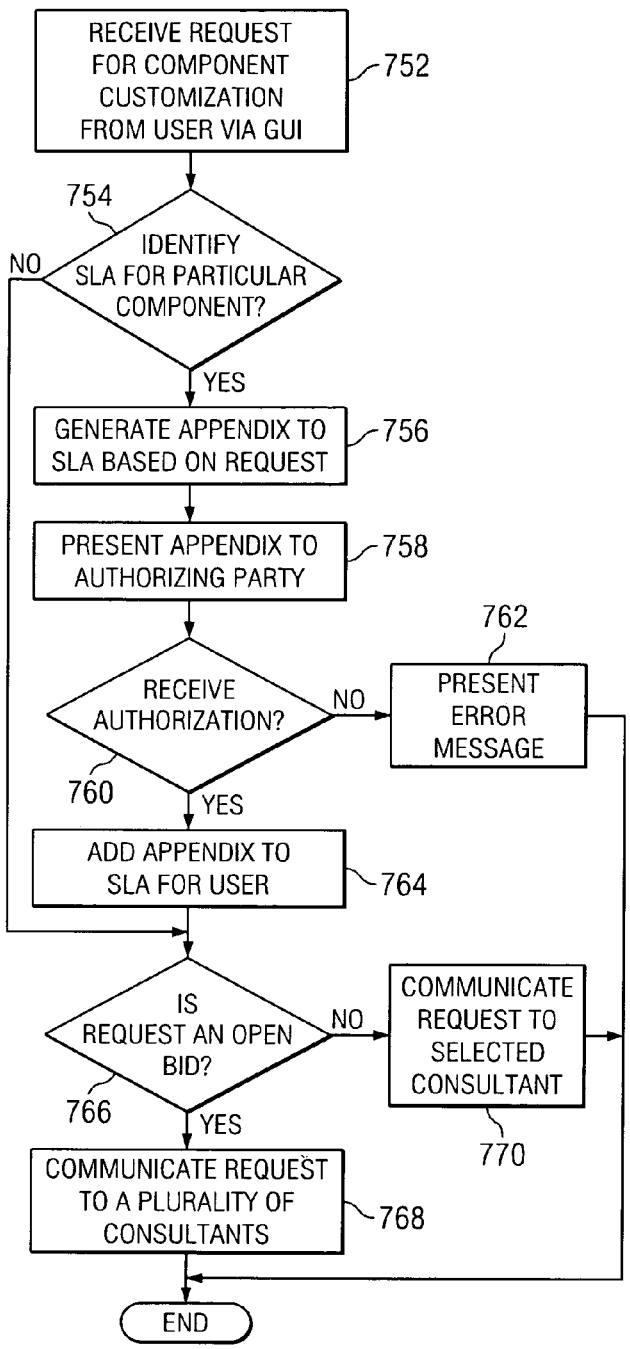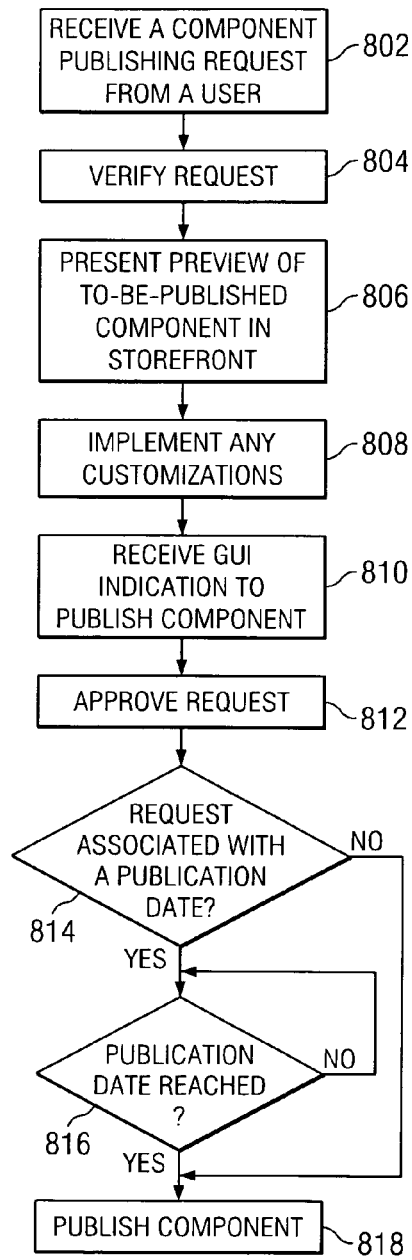

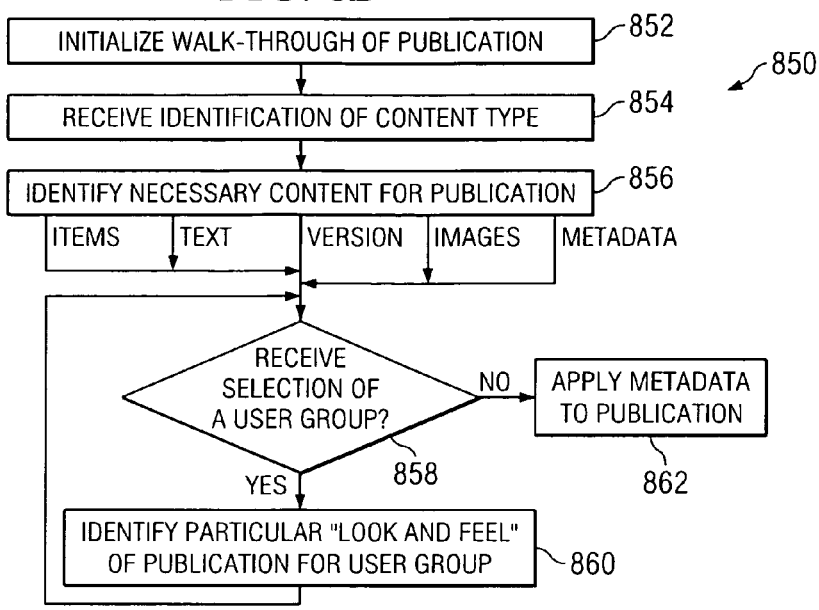
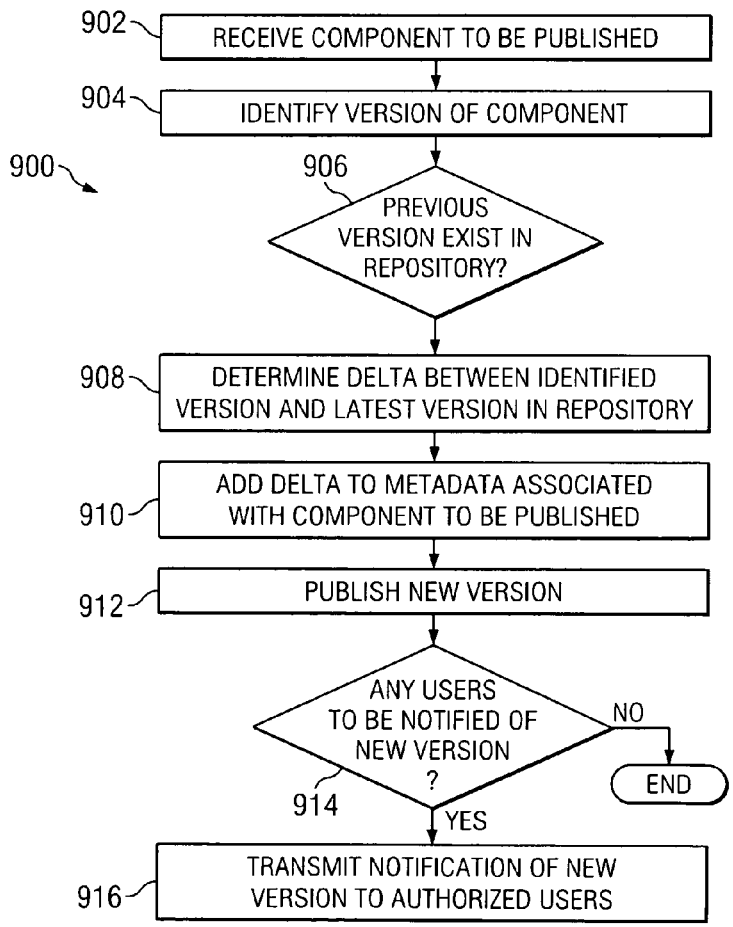

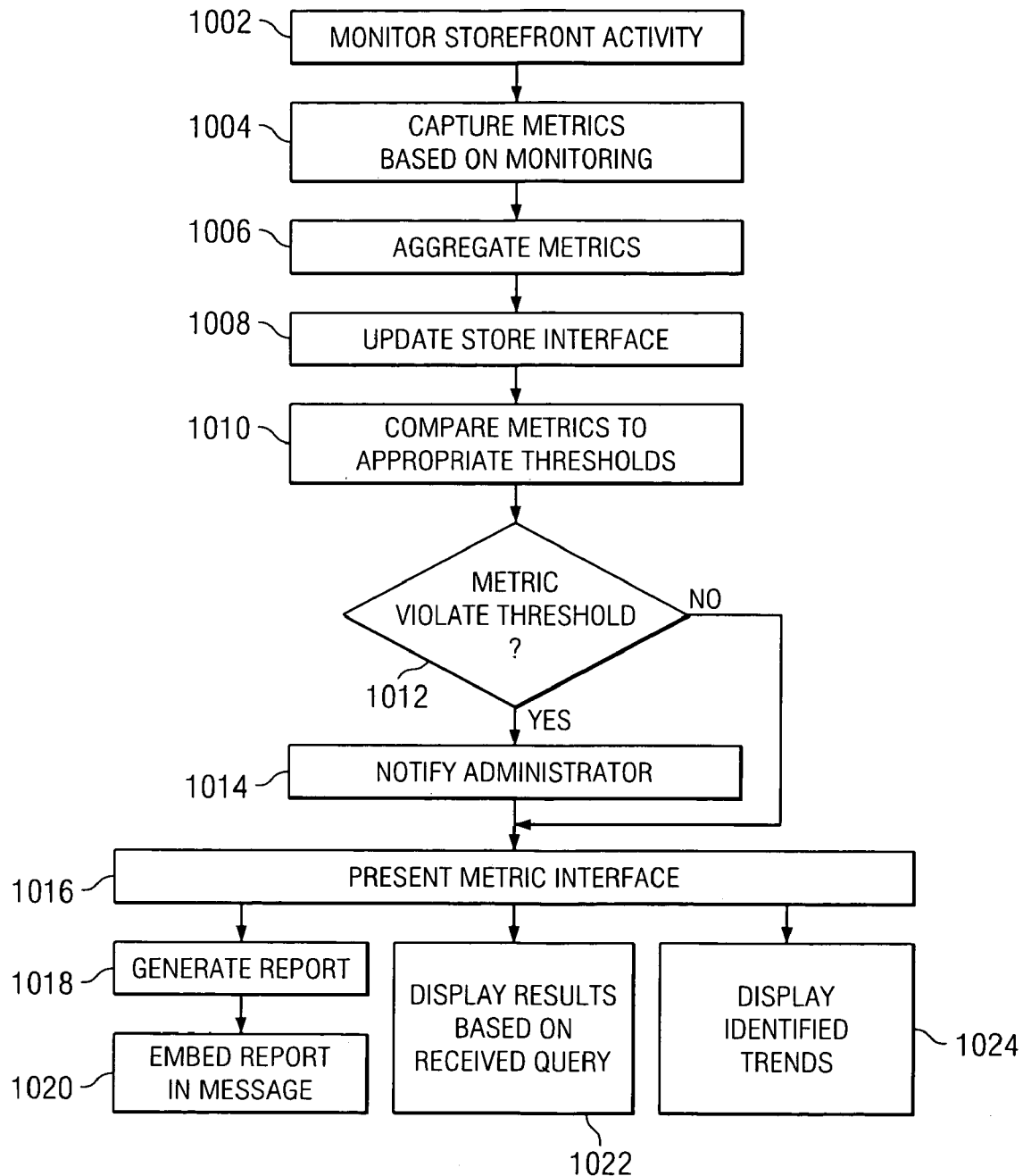

METHOD AND SYSTEM FOR UTILIZING DEVELOPMENT COMPONENTS

TECHNICAL FIELD

This disclosure relates to computer systems and methods and, more particularly, to methods, systems, and software for utilizing development components.

BACKGROUND

The amount of information in organizations is increasing exponentially. Much of this information is unstructured because complex, heterogeneous systems typically crowd the typical IT landscape such as, for example, applications or components of applications, documents on department file servers, web pages on subsidiary web servers, e-mail, groupware, slide presentations, and many others. These unstructured and unmanaged resources often contain mission-critical knowledge that companies need to maximize business advantage. In some situations, an enterprise portal may be used to provide a point of access to these applications, information, and services for employees and to transform that information into organizational knowledge. But these portals are often rather simple and merely provide one access point to underlying complexity. Moreover, customers and partners typically have a difficult time finding and understanding components that can be reused when creating new solutions. This difficulty may be increased because development components are frequently located in different repositories, are hard to find, are difficult to understand once found, and may be complicated to reuse when possible.

SUMMARY

The disclosure provides various embodiments of systems, methods, and software for presenting and otherwise utilizing development components. These development components are typically (but not necessarily) offered to a plurality of parties, via a storefront or other easy-to-use interface, who may then use such components for any suitable purpose. For example, one method for utilizing reusable development components includes presenting an interface to a remote user operable to display information for at least a first and a second development component. In some cases, the first development component is a first type of enterprise application content and the second development component of a second type of enterprise application content. The user is then allowed to update some portion of metadata associated with the first development component.

The foregoing example method—as well as other disclosed methods—may be computer implementable. Moreover some or all of these aspects may be further included in respective systems and software for presenting, and otherwise providing context-based content for a computer application. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIGS. 4A-K illustrate example graphical user interfaces (GUIs) for user registration as implemented by the application described in FIG. 2, FIG. 5 is a flowchart illustrating an example method for processing user registration into the system of FIG. 1;

FIG. 6 is a flowchart illustrating an example method for presenting a plurality of development components, potentially from a variety of content developers, using the system of FIG. 1;

FIGS. 7A-B are flowcharts illustrating example methods for processing user customizations and requests using the system of FIG. 1;

FIGS. 8A-B are flowcharts illustrating example methods for publishing components into the system of FIG. 1;

FIG. 9 is a flowchart illustrating an example method for versioning components imported, loaded, or otherwise published into the system of FIG. 1; and FIG. 10 is a flowchart illustrating an example method for managing metrics associated with the development components presented, selected, or otherwise managed in the system of FIG. 1.

DETAILED DESCRIPTION

Figure 1:
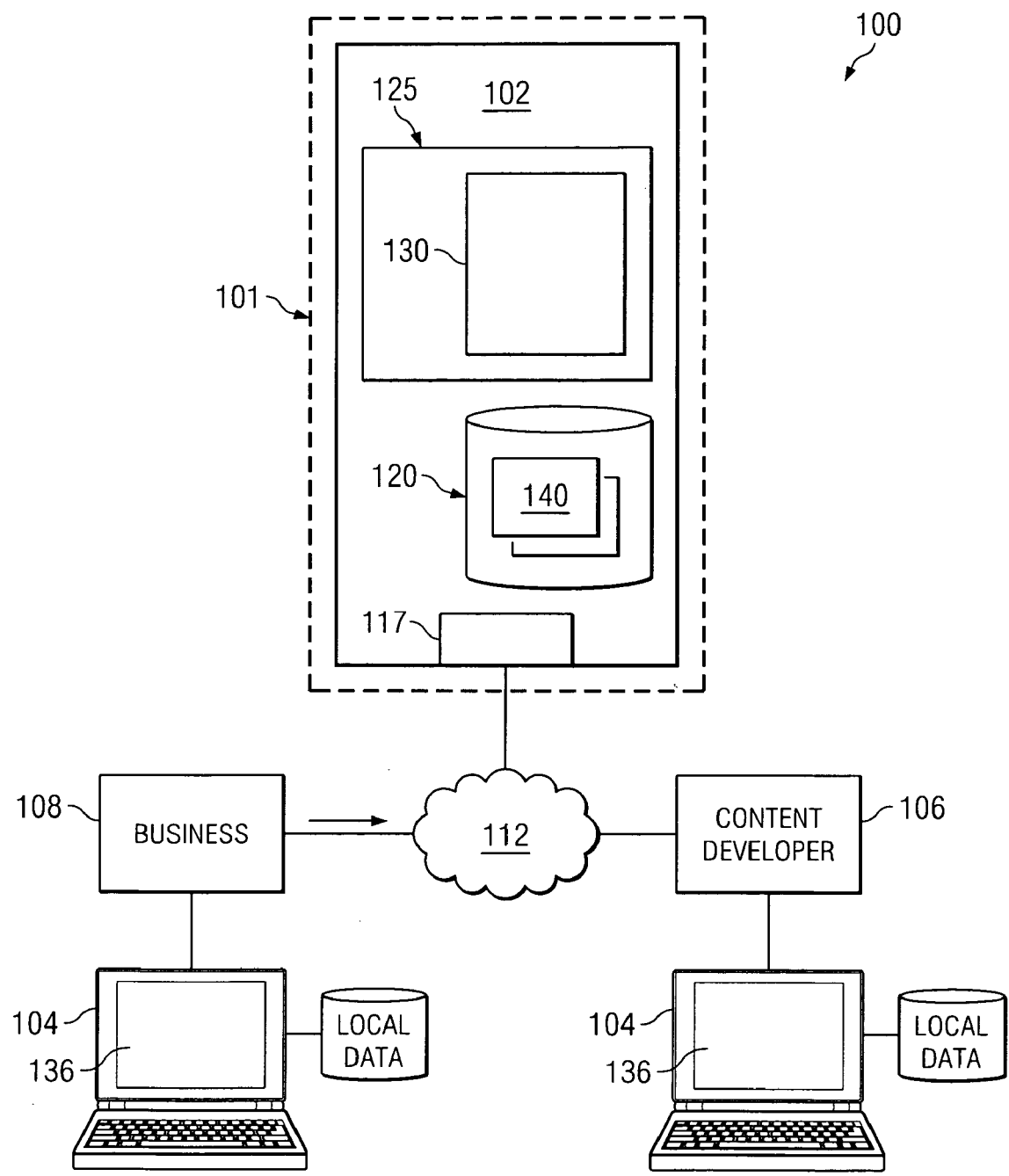
FIG. 1 illustrates an example system for processing user context in accordance with one embodiment of the present disclosure.

FIG. 1 illustrates an example system 100 for presenting, providing, or otherwise managing enterprise application content and other development components 140 via a content provider 101. For example, content provider 101 may be considered a storefront or retailer of business content and solutions. The storefront is an aggregated place for businesses 108 and users to evaluate and consume a number of different reusable components 140 for development, redevelopment, customization, or easy utilization of applications. This storefront can typically be accessed in a stand alone fashion (such as a website), within any suitable productivity tool (whether enterprise software, email application, and others) selected by the user or automatically interfaced, or in a cooperative fashion with a third party search engine. In other words, content provider 101 may manage and share a knowledge base of software assets or other development components 140 (often using metadata) that can easily be integrated into different developer, business analyst, and administrative tools. The value of this knowledge base normally grows with the usage of its customers and partners resulting in the continuous growth of the respective ecosystem. Generally, the content provider 101 uses a component manager 130, or other similar information hub of enterprise knowledge and components, to present a plurality of development components 140 to businesses 108, or their individual users, as well as other companies and users in the network. But, this component manager 130 may also be implemented by a stand-alone enterprise to help it leverage the existing development base of business processes and components 140 and how changing them would impact its application landscape. In this situation, the interface or associated components 140 may be shared by or individualized/tailored for particular departments. In fact, the storefront may be a source for both internal and external content, with the same or different interfaces and utilities. These development components may be gathered from a plurality of component developers 106 for easy review at component manager 130, which may be located or managed by content provider 101. For example, the content provider 101 may be one of the manufacturers of these development components 140, as well as the retailer of business content/solutions. This component manager 130 may, among other things, hide the complexity associated with finding and understanding reusable components, provide the storefront experience that enables the particular user to find and learn about the items they desire, or create a community around each item that contributes to the information and knowledge shared.

More specifically, component manager 130 may allow developers (or other suitable end users) to interact, share, get acknowledgement, as well as gain confidence that they are not alone in what they are doing. In another example, component manager 130 can deliver solutions that help enable customers to assess and access analytics that are relevant for them. To facilitate this delivery, component manager 130 may provide an easy to use product catalog of development components 140 that becomes ever more useful as the number of analytics offered by component provider 101 and its partners increases. Put another way, these development components are typically reusable in that they can be used in multiple solutions or versions of redeveloped solutions. This reuse may be furthered through the ability to easily find, understand, and adapt desired components. In yet another example, component manager 130 may be used to provide guidance on how to implement certain solutions. In certain cases, component manager 130 helps drive grass root adoption and hide complexity of multiple repositories and tools, thereby allowing easier data and component access and helping create an enjoyable customer experience and effective consumption of these components. For example, it may allow the user to implement real time synchronization with the most updated components versions, bug reports, and fixes for a wide variety of components 140.

In some cases, the component manager 130 is a hosted solution on a remote server 102 providing an easy-to-use interface for disparate development components 140 to at least one business 108 or user, potentially without requiring specific technical or data-specific knowledge. System 100 is typically a distributed client/server system that spans one or more networks such as 112. In such cases, the various components—such as servers 102 and clients 104—may communicate via a virtual private network (VPN), SSH (Secure Shell) tunnel, or other secure network connection. Accordingly, rather than being delivered as packaged software, system 100 may represent a hosted solution, either by or for content provider 101, that may scale cost-effectively and help drive faster adoption. In this case, portions of the hosted solution may be developed by a first entity, while other components are developed by a second entity. In such embodiments, data may be communicated or stored in an encrypted format using any standard or proprietary encryption algorithm. This encrypted communication may be between the user (or application/client) and the host or amongst various components of the host. Put simply, communication or other transmission between any modules and/or components may include any encryption, export, translation or data massage, compression, and so forth as appropriate. Further, system 100 may store some data at a relatively central location (over a WAN) while concurrently maintaining local data at the user's site for redundancy and to allow processing during downtime. But system 100 may be in a dedicated enterprise environment—across a local area network (over LAN) or subnet—or any other suitable environment without departing from the scope of this disclosure.

Turning to the illustrated embodiment, system 100 includes or is communicably coupled (such as via a one-, bi- or multi-directional link or network) with server 102, one or more clients 104, one or more content developers (or vendors) 106, one or more businesses 108, at least some of which communicating across network 112. Server 102 comprises an electronic computing device operable to receive, transmit, process and store data associated with system 100. Generally, FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server.

Illustrated server 102 includes local memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. Illustrated memory 120 includes development components 140 but may also include any other appropriate data such as VPN applications or services, firewall policies, a security or access log, print or other reporting files, HTML files or templates, data classes or object interfaces, child software applications or sub-systems, and others.

Development components 140 include software at any appropriate level of granularity that may be reusable by users, perhaps across businesses, user types, and platforms. These components 140 may be development assets that are developed by multiple developers (such as content provider 101 and content developer 106). More specifically, such development components 140 may include (among other things) industry applications, analytics, reusable components, objects, collaborative software and pages, request for comments (RFC) documents, relationships, processes, views, models, dashboards, and other business content (whether primary, secondary, or other), solutions, or identifiable portion thereof. For example, a first development component 140 may be a warehouse delivery dashboard created by a first content developer 106, a second development component 140 may be a view of common warehouse data objects created by a second content developer 106, a third development component 140 may be a canned inventory report developed by the first content developer 106, a fourth development component 140 may be a web service for tracking such inventory, while a fifth development component 140 may be an enterprise software application—developed exclusively for the requesting user or customized to meet his requests by content provider 101—operable to manage some of the former components 140. In another example, a development component 140 may be an automated alert (event) that can be automatically sent to a recruiting manager each time a candidate declines an offer based on the manager's subscription preferences. Regardless of the particular type, category, or classification of the component, system 100 often stores metadata and other identifying information along with the actual piece of software (whether object or source). For example, the component may further include each element's definition, lifecycle history, dependents, dependencies, versions, use or "big name" cases, industry types or associations, role types, security profile, and usage information.

Development components 140 (and their accompanying information) may be stored in one or more logical or physical repositories. In some embodiments, development components 140 (or pointers thereto) may be stored in one or more tables in a relational database described in terms of SQL statements or scripts. In the same or other embodiments, development components 140 may also be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. For example, a particular development component record may merely be a pointer to a particular piece of third party software stored remotely. In another example, a particular development component may be an internally stored software object usable by authenticated customers or internal development. In short, development components 140 may comprise one table or file or a plurality of tables or files stored on one computer or across a plurality of computers in any appropriate format. Indeed, some or all of development components 140 may be local or remote without departing from the scope of this disclosure and store any type of appropriate data.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes at least component manager 130.

At a high level, the component manager 130 is software operable to provide an interface to a plurality of solutions and some or all of the underlying reusable components 140 that can be used for these solutions. More specifically, component manager 130 is any application, program, module, process, or other software that helps manage at least a portion of development components 140 and is operable to present certain components 140 though interface 136 for viewing and potential use or purchase by others. In one embodiment, component manager 130 may represent the back-end processing of one access point where product groups, partners, community members, or other authorized users can upload, search for, evaluate, download, rate/rank, receive certification, view documentation, and such of services, lightweight or other composites, analytics dashboards, applications, and any other components or solutions. More specifically, component manager 130 is often operable to enable the creation and display of new relationships between components, make the particular component the center of its universe (such as a business object), and enable new information/knowledge/guidance to be added. In certain embodiments, component manager 130 may implement further functionality including being operable to: i) support versions, feedback, updates; ii) notify client-side applications such that they become aware of updates that are available; iii) present a "try before you buy" option; iv) to control/charge for access and downloads; v) manage or present mega-catalog plus the ability to have site- or customer-specific sub-catalogs; vi) provide a back-end to any of these catalogs for publishers, managers, reviewers; vii) optimize consumption process via analysis of information collected; viii) certify users that can rate and submit content/feedback; and ix) manage permissions for users and allow users to determine what access rights they have. Of course, some or all of this further functionality may not be present or enabled in certain implementations of component manager 130. In certain cases, component manager 130 may be further operable to perform other types of processing or include links to such other functionality. For example, component manager 130 may implement, include, or be communicably coupled with a business application 132, as described below in reference to example FIG. 3. In another example, component manager 130 can be an application layer that sits on top of a development environment. In yet another example, component manager 130 can reside on top of any suitable repository. In a further example, component manager 130 can have an integration point into any suitable tool or be hosted within a software development or other network.

Figure 2:
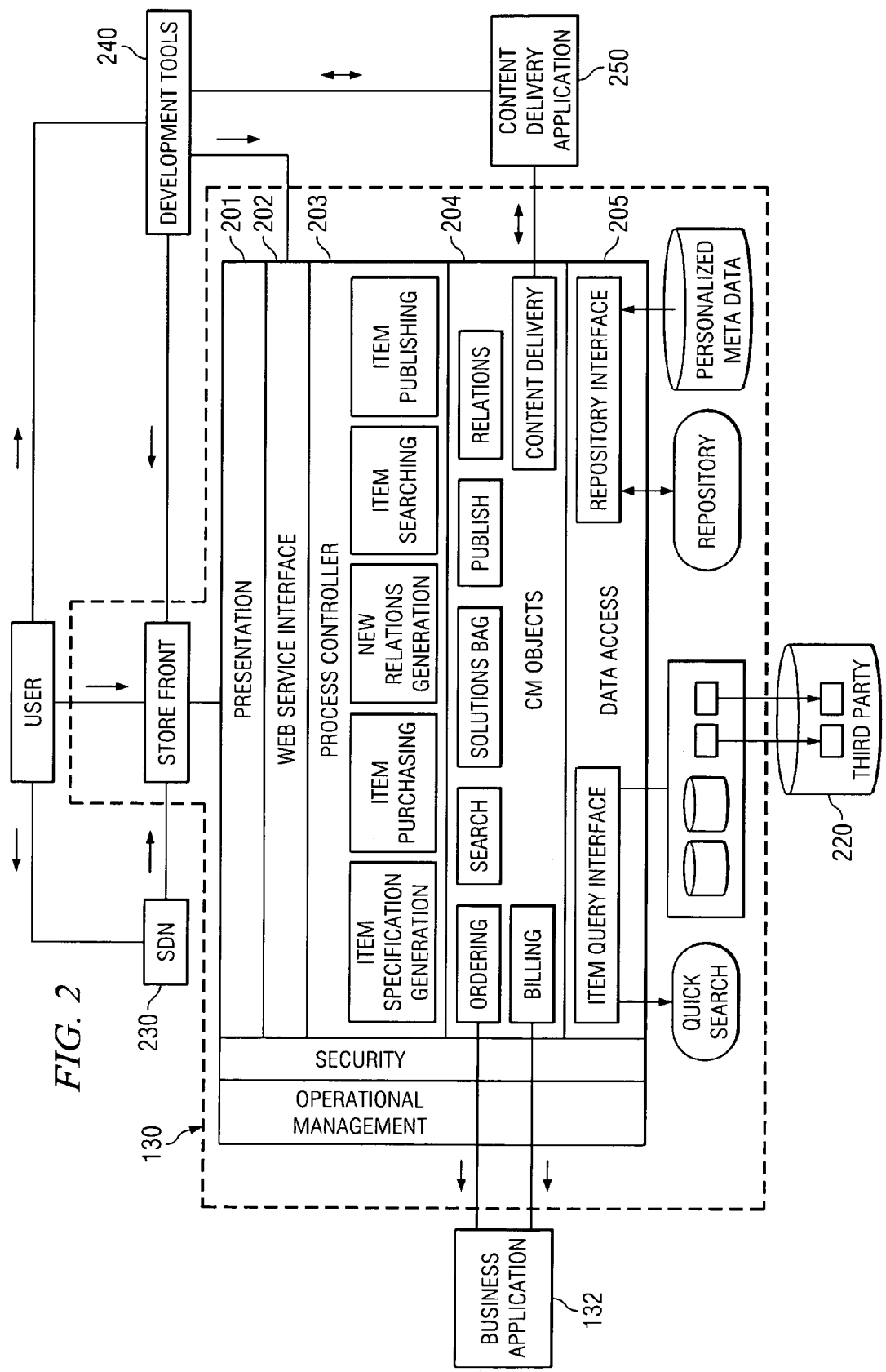
FIG. 2 illustrates a more detailed example of component manager implementing certain techniques and components in accordance with one embodiment of the system of FIG. 1.

Regardless of the particular implementation, "software" may include software, firmware, wired or programmed hardware, or any combination thereof as appropriate. Indeed, component manager 130 may be written or described in any appropriate computer language including C, C++, Java, J#, Visual Basic, assembler, Perl, any suitable version of 4GL, as well as others. It will be understood that while component manager 130 is illustrated in FIG. 2 as including a number of sub-modules, component manager 130 may instead be a single multi-tasked module that implements the various features and functionality through various objects, methods, or other processes. Further, while illustrated as internal to server 102, one or more processes associated with component manager 130 may be stored, referenced, or executed remotely. For example, a portion of component manager 130 may be a web service that is remotely called, while another portion of component manager 130 may be an interface object bundled for processing at remote client 104. In another example, the majority of processes or modules may reside—or processing take place—on client 104. Moreover, component manager 130 may be a child or sub-module of another software module or enterprise application (not illustrated) without departing from the scope of this disclosure. At any rate, component manager 130 is generally operable perform processing automatically, which may indicate that the appropriate processing is substantially performed by at least one component of system 100, such as parts of component manager 130 illustrated in FIG. 2. It should be understood that automatically further contemplates any suitable administrator or other user interaction with component manager 130 or other components of system 100 without departing from the scope of this disclosure.

Server 102 may also include interface 117 for communicating with other computer systems, such as clients 104, over network 112 in a client-server or other distributed environment. In certain embodiments, server 102 receives data from internal or external senders through interface 117 for storage in memory 120, for storage in DB 135, and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. For example, server 102 may be communicably coupled to one or more "local" repositories through one sub-net while communicably coupled to a particular client 104 or "remote" repositories through another. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and certain local or remote content developers 106 and businesses 108. As used in this disclosure, business 108 is any person, department, organization, small business, enterprise, or any other entity that may use or request others to use system 100, namely component manager 130, to download or purchase reusable components 140, at least some of which were created, modified, or otherwise uploaded by developer 106 to content provider 101. As described above, developers 106 also may be local or remote to business 108. Indeed, a particular developer 106 may provide some content to component manager 130, while receiving or purchasing other content (at the same or different times) as business 108. As illustrated, business 108 and developer 106 each typically perform some processing (such as uploading or purchasing content) using a computer, such as client 104.

Client 104 is any computing device operable to connect or communicate with server 102 or network 112 using any communication link. For example, client 104 is intended to encompass a personal computer, touch screen terminal, workstation, network computer, kiosk, wireless data port, smart phone, personal data assistant (PDA), one or more processors within these or other devices, or any other suitable processing device used by or for the benefit of business 108, vendor 106, content provider 101, or some other user or entity. At a high level, each client 104 includes or executes at least GUI 136 and comprises an electronic computing device operable to receive, transmit, process and store any appropriate data associated with system 100. It will be understood that there may be any number of clients 104 communicably coupled to server 102. Further, "client 104," business," "developer" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 136. Both the input device and output device may include fixed or removable storage media such as a magnetic computer disk, CD-ROM, or other suitable media to both receive input from and provide output to users of clients 104 through the display, namely the client portion of GUI or application interface 136.

GUI 136 comprises a graphical user interface operable to allow the user of client 104 to interface with at least a portion of system 100 for any suitable purpose, such as viewing application or other transaction data. Generally, GUI 136 provides the particular user with an efficient and user-friendly presentation of data provided by or communicated within system 100. For example, GUI 136 may present the user with the components and information that is relevant to their task, increase reuse of such components, and facilitate a sizable developer community around those components. As shown in later figures, GUI 136 may comprise a plurality of customizable frames or views having interactive fields, pull-down lists, and buttons operated by the user. For example, GUI 136 is operable to display certain development components 140 in a user-friendly form based on the user context and the displayed data. In another example, GUI 136 is operable to display different levels and types of information involving development components 140 based on the identified or supplied user role. GUI 136 may also present a plurality of portals or dashboards. For example, GUI 136 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by development components 140. It should be understood that the term graphical user interface may be used in the singular or in the plural to describe one or more graphical user interfaces and each of the displays of a particular graphical user interface. Indeed, reference to GUI 136 may indicate a reference to the front-end or a component of component manager 130, as well as the particular interface accessible via client 104, as appropriate, without departing from the scope of this disclosure. Therefore, GUI 136 contemplates any graphical user interface, such as a generic web browser or touchscreen, that processes information in system 100 and efficiently presents the results to the user. Server 102 can accept data from client 104 via the web browser (e.g., Microsoft Internet Explorer or Netscape Navigator) and return the appropriate HTML or XML responses to the browser using network 112, such as those illustrated in FIG. 4.

FIG. 2 illustrates a more detailed example of component manager 130 implementing certain techniques and components in accordance with one embodiment of system 100. Component manager 130 may be linked to, interfaced with, or otherwise communicably coupled with other modules including business application 132 (described in more example detail in FIG. 3), third party component repository 220, software development network 230, internal or third party development tools 240, and content delivery application 250. This coupling may be across enterprises or parties via any suitable channel. For example, component manager 130 may be interfaced into a third party application at business 108 via a macro, web service, application programming interface (API), frame, or other suitable link, reference, or channel. Indeed, component manager 130 may be concurrently interfaced into another third party application at business 108 via the same or another of the macro, web service, API, frame, and such. Indeed, component manager 130 may be executing on a first platform, yet seamlessly referenced by an application or development tool 240 executing on a second platform. Component manager 130 may be further seamlessly referenced by a second application or development tool 240 executing on a third platform. In another example, the lead page for the front end of component manager 130 may be linked to or framed by software development network 230, user group, or other website.

At a high level, illustrated component manager 130 includes a number of layers, namely a presentation or interface layer 201, a web service interface 202, a process controller 203, component manager object layer 204, and a data access layer 205. Component manager 130 may further include operational management and security layers as appropriate. For example, the security layer may allow a manager to establish or change access for users, groups, roles, locations, internal/external (perhaps based on logical network locations) to one or more individual or groups of development components 140. Such access may include read, write, delete, publish, purchase, preview, and others or fewer as appropriate. This security capability may also be fully or partially offered to customers, developers, or other partners to (for example) help manage access to their development components 140. Process controller 203 manages any number of sub-modules, process, or objects including item generation, component purchasing, relations generation, item searching, and component publishing. Each of the processes creates, utilizes, or otherwise manages one, some, or all of the content manager objects. These objects may include ordering, billing, search object, software solutions bag, publishing object, relations, and content delivery. For example, the ordering or billing objects may interface with an internal or outside business application, such as 132, to facilitate the purchase or licensing of components 140 by the requesting user. The search object may include search parameters, user identification for filtering, or other data to help enable user friendly searches, role-based searches, usage-based searches, or others. The software solutions bag object packages, groups, bundles, or otherwise collects reusable components 140, perhaps with its accompanying information such as metadata, relationships, and such. The software solutions bag may be accessible across internal or third party applications and be independent of particular tools or compilers. Moreover, this bag may be associated with a project team or business 108 instead of just one lone user. In this way, the bag can by partially populated by a first user and completed by a second. Indeed, this bag may be associated with a particular user, but be accessed by the user's manager or other project members based on security settings. For example, the first user may create or change the bag and then email the bag (or a pointer thereto) to the second user. In another example, the first user may access the bag via a first application (such as a development tool), while the second user may access the bag via a second application (such as a sales or marketing center). It will be understood that while termed as a software solutions bag, it may be any object considered any logical or software implemented bag, basket, cart, or other container data structure. Moreover, this example project team may represent a quality assurance group, an organization of similar roles (such as developers), a standards group, a department (such as research and developments IT, business assurance, or marketing), or any other logical or physical organization of users. Occasionally, membership in this team may be authenticated prior to allowing other members to view or manage the bag. The publish object and relations object may help component manager 130 manage the publication and interrelationships of components 140. Further, content delivery object may encapsulate the purchased or requested (for consumption or trial) components 140 for efficient delivery to business 108, perhaps even to the appropriate development tool 240 to speed reuse. For example, one member of the "project team" may drop this software solutions bag into a storyboard or other shared environment for viewing and potential manipulation by other members of the "project team." In another similar example, this software solutions bag may be automatically linked or presented to the shared environment upon authentication of or access by a particular user. More specifically, this storyboard may be an interface that the user can access for portal content development and is used to draw and compose model diagrams using a simple and intuitive visual notation.

The data access layer may implement several interfaces to data or data repositories including a search or query interface and a component manager repository interface. In this example, the search interface may utilize a quick search capability (or third party search portal) to select or collect components 140 stored in local repositories or third party repository 220. The component manager repository interface may allow component manager 130 to store information about users, businesses 108, content developers 106, or any other suitable party. This information may include search history, account balances, user or business profiles, user group list, instances of the component manager objects, security profiles or login/registration information, licenses or contracts, and others. For example, the user profile may include some or all of search history, purchase history, user role, business type, and existing software (whether licensed to his associated business 108 or installed on his machine). Such information may be used to supplement or refine search results selected based on the user's search criteria.

It will be understood that while this example describes one configuration of component manager 130, it may instead be a standalone or (relatively) simple software program integrated with other distributed modules or functionality. Moreover, component manager 130 may locally include or be remotely linked with some or all of the illustrated components, as well as others not illustrated.

Figure 3:
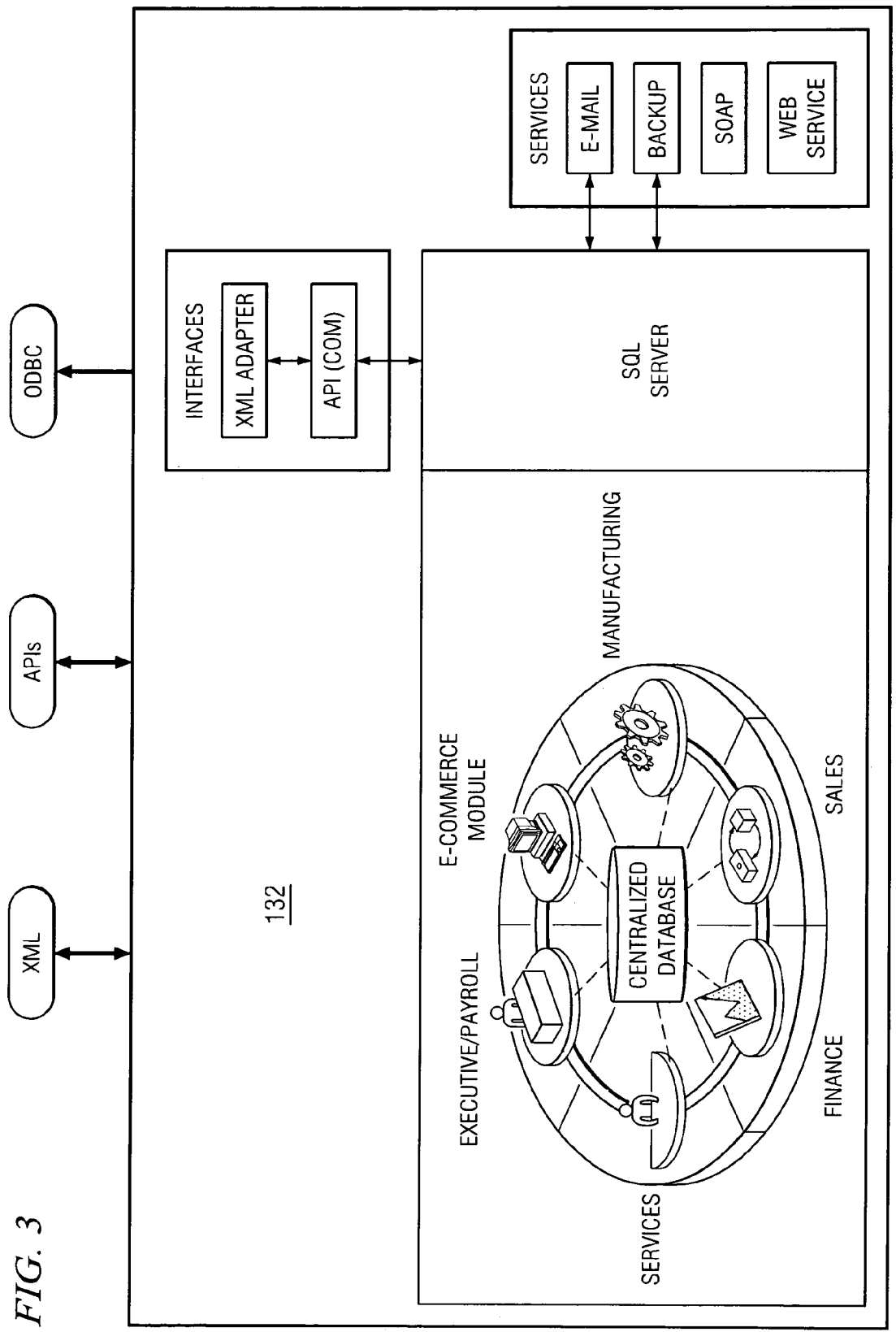
FIG. 3 illustrates an example business application communicably coupled with (or part of) the example component manager of FIG. 2.

FIG. 3 illustrates an example hosting infrastructure implementing various processes and modules in accordance with one embodiment of the system of FIG. 1. Of course, while described as a hosted solution, any similar internal or third party implementation may suffice and be within the scope this disclosure. Returning to the illustration, component manager 130 is communicably coupled with a business application 132. Business application 132 may be considered any business software or solution that is capable of interacting or integrating with local and third party modules 134 to provide the user with some purchasing, inventory, billing, or other business processing. More specifically, an example application 132 may be a computer application for performing any suitable business process by implementing or executing a plurality of steps. This example application 132 may be a composite application, or an application built on other applications, that includes an object access layer (OAL) and a service layer. In this example, application 132 may execute or provide a number of application services, such as customer relationship management (CRM) systems, human resources management (HRM) systems, financial management (FM) systems, project management (PM) systems, knowledge management (KM) systems, e-commerce compatibly and functionality, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 132 may run on a heterogeneous IT platform. In doing so, composite application may be cross-functional in that it may drive business processes across different applications, technologies, and organizations. Accordingly, composite application 132 may drive end-to-end business processes across heterogeneous systems or sub-systems. Application 132 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability.

The example composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's NET. But it will be understood that while this example describes a composite application 132, it may instead be a standalone or (relatively) simple software program integrated with other hosted modules or functionality.

FIGS. 4A-K illustrate example graphical user interfaces (GUIs 136a-k respectively) of component manager 130 for processing user contexts as described in method 600. Put another way, GUI 136 provides a front-end for local or distributed component manager 130, which may be collectively termed the storefront. Interface 136 may be presented by a web browser that displays appropriate network pages including HTML, Java, PHP (self-referential PHP: Hypertext Preprocessor), ASP (Active Server Pages), or other pages populated, at least in part, by component manager 130. Each page may be hidden, minimized, or otherwise placed out of sight of the user, while still including data that could be considered "presented." For example, GUI 136 presents a centralized community based location with taxonomies and intuitive search capabilities that will enable different segments of end users which are not very technical to view applications' information that is relevant to their task and suited to their skill set level. Particularly, some of these GUIs 136 provides a view of extensive metadata information on components 140 including business cases, use cases, Key Performance Indicators (KPIs) or Key Success Indicators (KSIs), screenshots, demos, versions, experts on component usage, related components, configuration hints and tips), test cases and results, community feedbacks and ratings. In another example GUI 136 may be operable to provide filtered views of component information based on user's task or skill set and provide the ability to see community's feedback and provide feedback to it. In this way, contextual information on select components can be viewed through the desired domain view/perspective. Further, this intuitive way often helps the user search, find, and understand what component is more adequate for the business needs and can help the non-technical user and developer alike. In some cases, GUI 136 may make the search for such components more appealing for the often daily tasks of searching for the right item. Generally, these example interfaces 136a-k present various presentations of data throughout the search, as described in subsequent flowcharts. Of course, these interfaces are for example purposes only and component manager 130, or its components (such as 132 and 134) may provide any suitable interface operable to display at least transaction data 202 and one or more development components 140—indeed, such displayed information may be communicated or presented in any suitable format or layout.

Regardless of the particular hardware or software architecture used, component manager 130 is generally capable of managing at least a portion of development components 140, presenting certain components 140 though interface 136 for viewing and potential use or purchase by others, and executing various other related business processes and techniques. Some of these processes, such as providing target secondary content and providing feedback on such content, are illustrated in certain flowcharts described below. The following descriptions of the flowcharts focus on the operation of component manager 130 in performing the respective method. But system 100 contemplates using any appropriate combination and arrangement of logical elements implementing some or all of the described functionality. For example, some of the processing or other techniques may be implemented by business application 132 or other invoked or referenced libraries or sub-modules not illustrated.

FIG. 5 is a flowchart illustrating an example method 500 for processing user registration into system 100. Generally, method 500 describes the registration of a new user of component manager 130 and the various processes involved in collected needed or optimal user and business information. In certain cases, component manager 130 may automatically register the user without presenting a wizard or implementing a similar method. In other cases, business 108 (or content developer 106) may activate or register component manager 130, without any subsequent user registration. But returning to illustrated method 500, component manager 130 presents an introduction page to a user at step 502. This introduction page is typically presented based on a request from the client 104, such as an HTTP request for a web page. The introduction may present information such as, for example, marketing text, feature descriptions, a narrated video tour, testimonials from other business 108 and content developer 106. Next, at step 504, component manager 130 determines if the requesting user is already a registered user. Such a determination may be made using a cookie, a user selection, or via other techniques. If the user is already registered, then component manager 130 grants presents the user with a sign-in page at step 506 and grants the user access to component manager 130 upon authentication at step 508. The sign-in page may include or present a user name field that uses an email address and remember access within cookie if the user requests and pre-populates the login field with user's address. The page also typically includes a password field that may be user-specified and hint available if the user forgets. This password may first be sent through email and be as complex as necessary to help assure security. The sign-in page or the first page after authentication may also display application news and insights such as new features, new services, new partners, how-to tips, small-business advice, and others.

But if the user is not a registered user, then component manager 130 may the display the general registration process that the new user will follow at step 510. For example, such registration may include several steps to identify, retrieve, or otherwise collect information form the user. This example information may include registration data (like email, name, company, etc.) and other information that can be used for customization if the user wishes (such as industry, role, address, and professional interest areas). In this example, component manager 130 collects and verifies user information at step 512 using GUI 136. This information may include the registrant's first and last name, the registrant's email address (typically used as username for sign in and provides immediately-useful contact information), and the registrant's role in business 104. This role may be selected from a limited, very general list to help normalize roles across businesses 104. In certain cases, this list presented to the user after business data is gathered so that it may be populated based on the business type or other business context. Next, at step 514, component manager 130 collects and verifies sign-in information. This sign-in information may comprise the registrant's password (perhaps entered twice to ensure accuracy), a password hint, and the registrant's personal identification information to enable support to verify user.

As illustrated, component manager 130 then collects and verifies the business data to help provide some context and enable subsequent rolling registration. For example, at step 516, component manager 130 collects and verifies business information such as the business names (often both official or how the business is known legally and public or how the business is known to its customers), phone number, business address, web address, primary contact email address, or other useful business contact information. This collected information is then stored in a repository 120 subsequent processing at step 518. In some cases, the user may customize his view of the storefront as shown at step 520. For example, the user can customize the views using a guided procedure. This customization can be based on the users preferences (results layouts, search criteria) and also using the registration data the user supplied (role, industry, address, etc.) or a combination of both. The user can also save customizations in parallel (for instance 2 results filters).

Once the user and business information has been collected, this demographic information may be used to help determine more appropriate components 140 or otherwise help searching. FIG. 6 is a flowchart illustrating an example method 600 for presenting a plurality of development components, potentially from a variety of content developers 106, using the system of FIG. 1. Method 600 begins at step 602, where component manager 130 receives a request for the storefront from a user on client 104. As described above, this user may be an end user, developer, manager, or other suitable user of client 104 for example. Indeed, component manager 130 may automatically determine the role of the requesting user in an effort to provide more tailored information based on this role. For example, a developer role may see more detail when he finds an artifact of interest, while a business analyst role may see less technical detail with more business content. Moreover, the user can conduct a search directly from the business's development tools via an API or conduct a search using a web interface (or other software development network or ring) using any suitable client such as the example PDAs, laptops, desktops, automobiles, and others. Next, when appropriate, the requesting user is authenticated using any suitable technique at decisional step 604. For example, the user may log in using credentials created in the fashion described above. In another example, the user may use a VPN or other similar secured access.

Once component manager 130 provides access or otherwise returns the requested page at step 606, then the user searches for one or more development components 140 often of different types and vendors. In this way, the search parameters at step 608 should allow a non-technical user to find the more appropriate components 140. The user should be able to use a customized search, in which the storefront filters those items that are less relevant for that user on that particular search. This filtering is normally based on combinations of the user's role, industry, line of business, IP Address, company size, and such. The user can also use a customized search to save time, or create a search from the scratch. For example, interface 136a (FIG. 4A) allows the user to add tags or other metadata that help identify the desired components. Then, as shown in interfaces 136b-f (FIGS. 4B-F), the user can add manually input filters to the search. These filters may include industry type (interface 136b), solution type (interface 136c), role type (interface 136d), item type (interface 136e), as well as many others. Indeed, based on previously provided or dynamically-determined information, component manager 130 may automatically populate certain of these fields. After the user adds the appropriate filters and tags, he may input or provide additional search words or terms to help narrow the results as shown in interface 136f. While shown as a certain search engine, these searches may implement some or all (as well as other) of the following capabilities: i) text based search; ii) structured search (categories based search); iii) parameter based search (input parameters, output parameters); and iv) dependency-based search (parent-child, brother-brother relations). In any of these ways, the search should allow technical and non-technical persons with different skills and capabilities to conduct a professional, yet simple and user friendly search of reusable development components 140. In some cases, component manager 130 may store the search or metadata associated with the search to help tailor subsequent searches.

Based on these parameters (and any other determined context, user or business information, or other data), content manger then locates, selects, or identifies any—if any—appropriate development components 140 at step 610. As necessary, component manager 130 may identify the particular repository storing each selected component and request it as needed. For example, many of the identified items may be stored within content provider 101. But, in this example, others may be located across network 112 at various entities, such as content developer 106, and storage locations. As described above, component manager 130 may filter these results based on the input filters or dynamically-determined criteria (such as account balance, company size, contractual conditions). Moreover, component manager 130 may further filter or supplement the results based on the user's prior searches, the core of which may have been saved to the appropriate repository. For example, component manager 130 suggests additional component 140 based on historic usage, analysis of models and relationships between components, and such. In another example, component manager 130 may prioritize these results based on usage metrics including most searched items, most purchased components 140, composite opportunities, supply and demand curves, contractual obligations (such as prioritized placement), or other criteria.

Figure 4A:
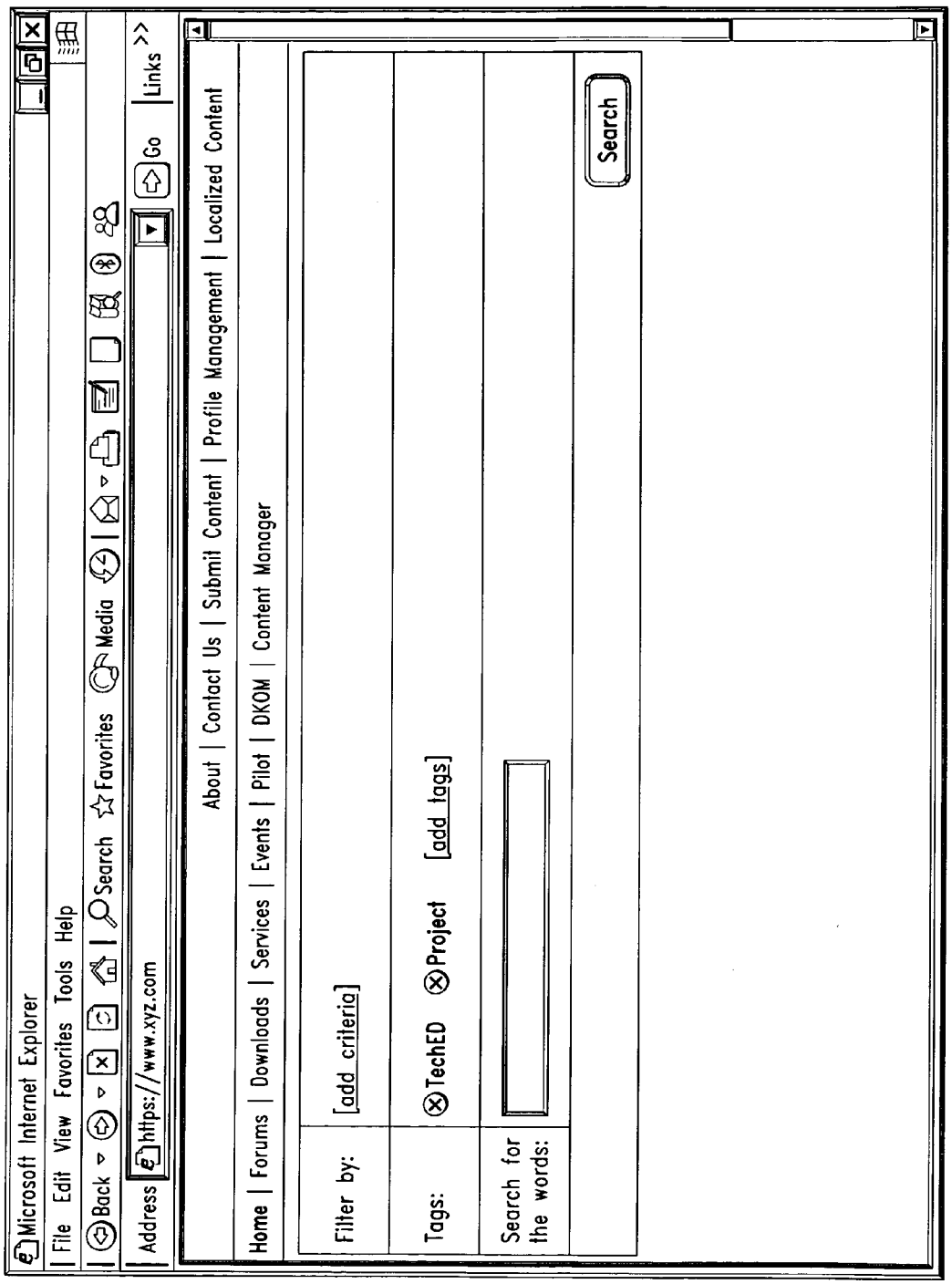
Figure 4B:
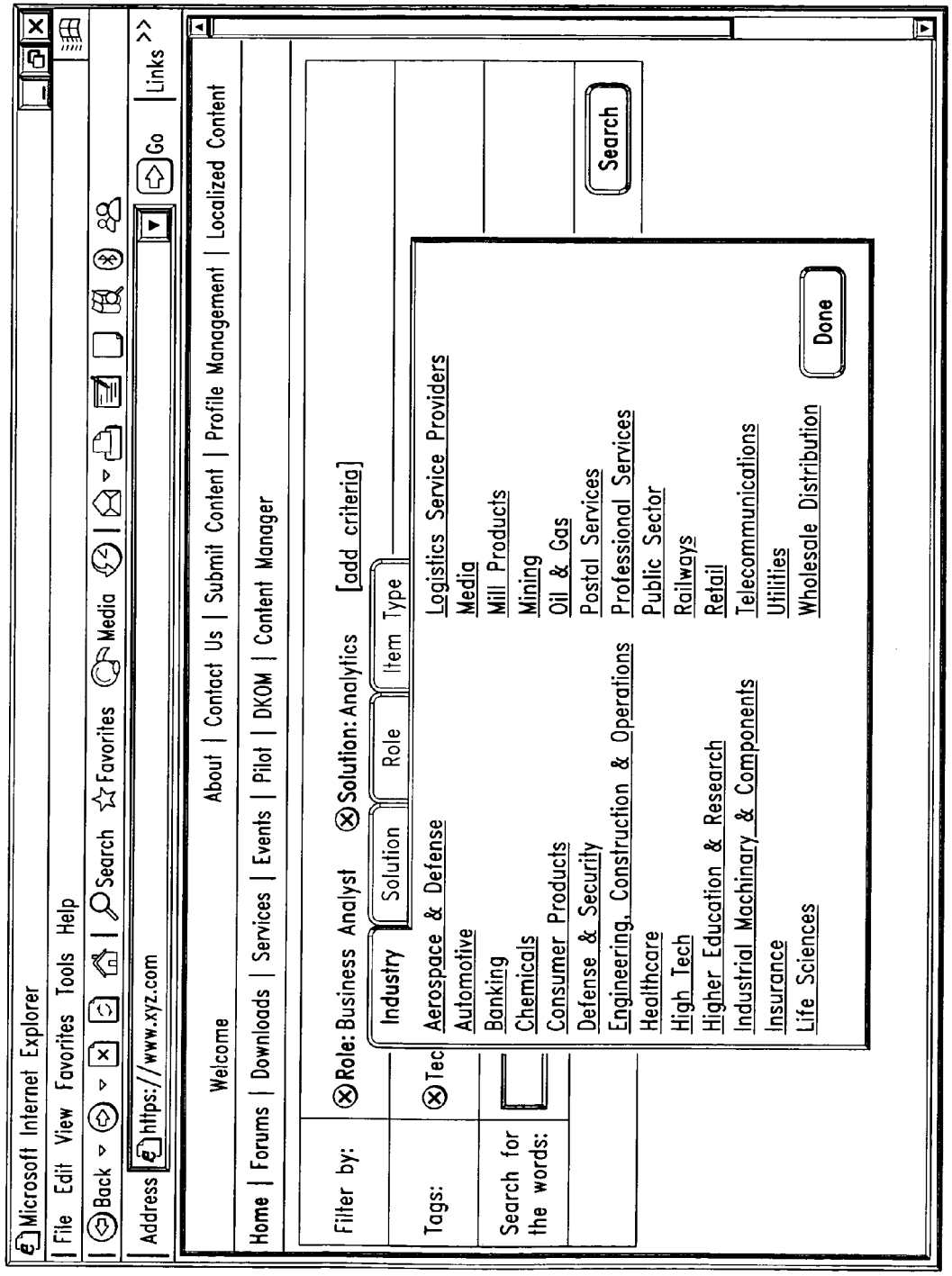
Figure 4C:
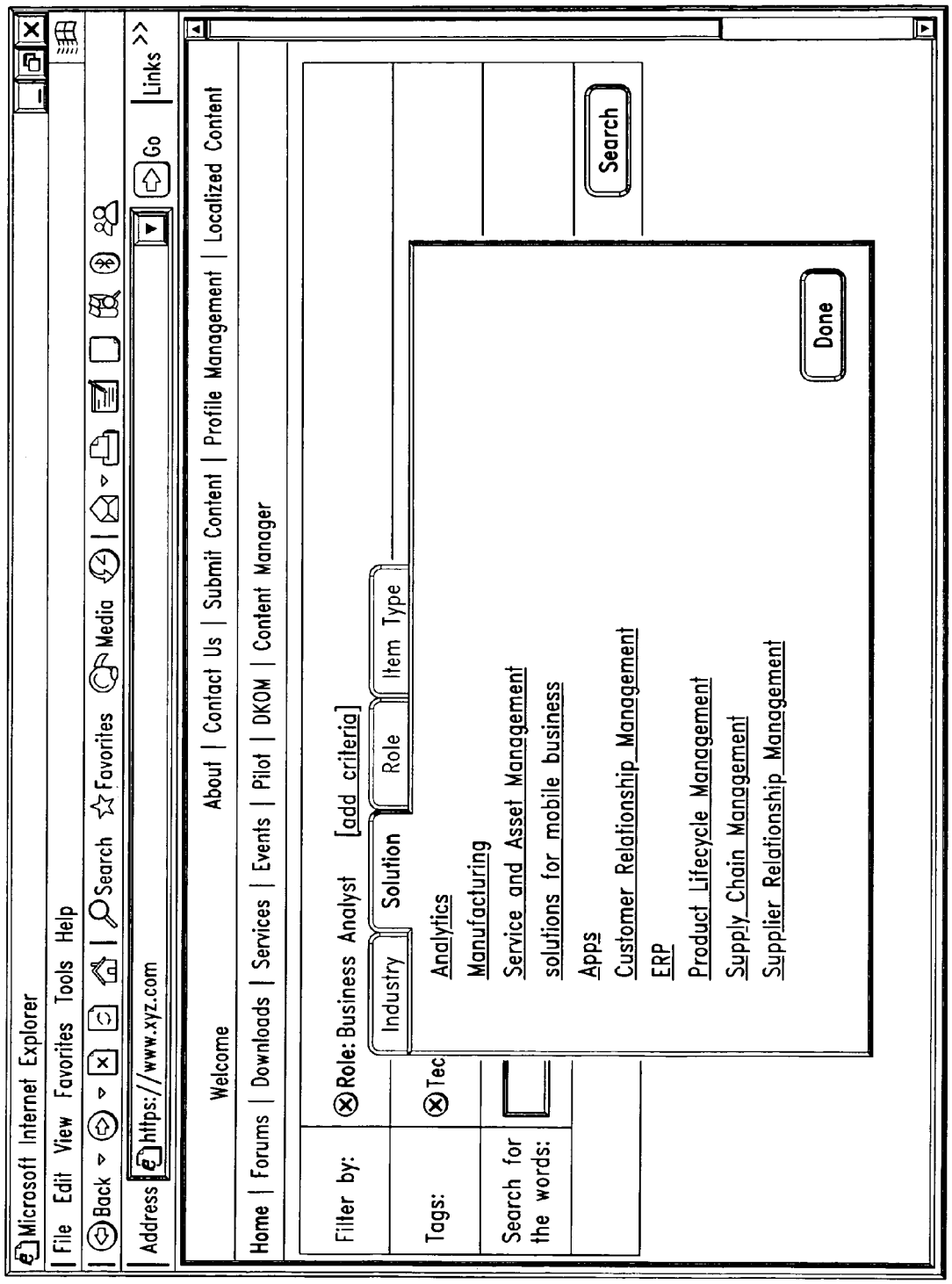
Figure 4D:
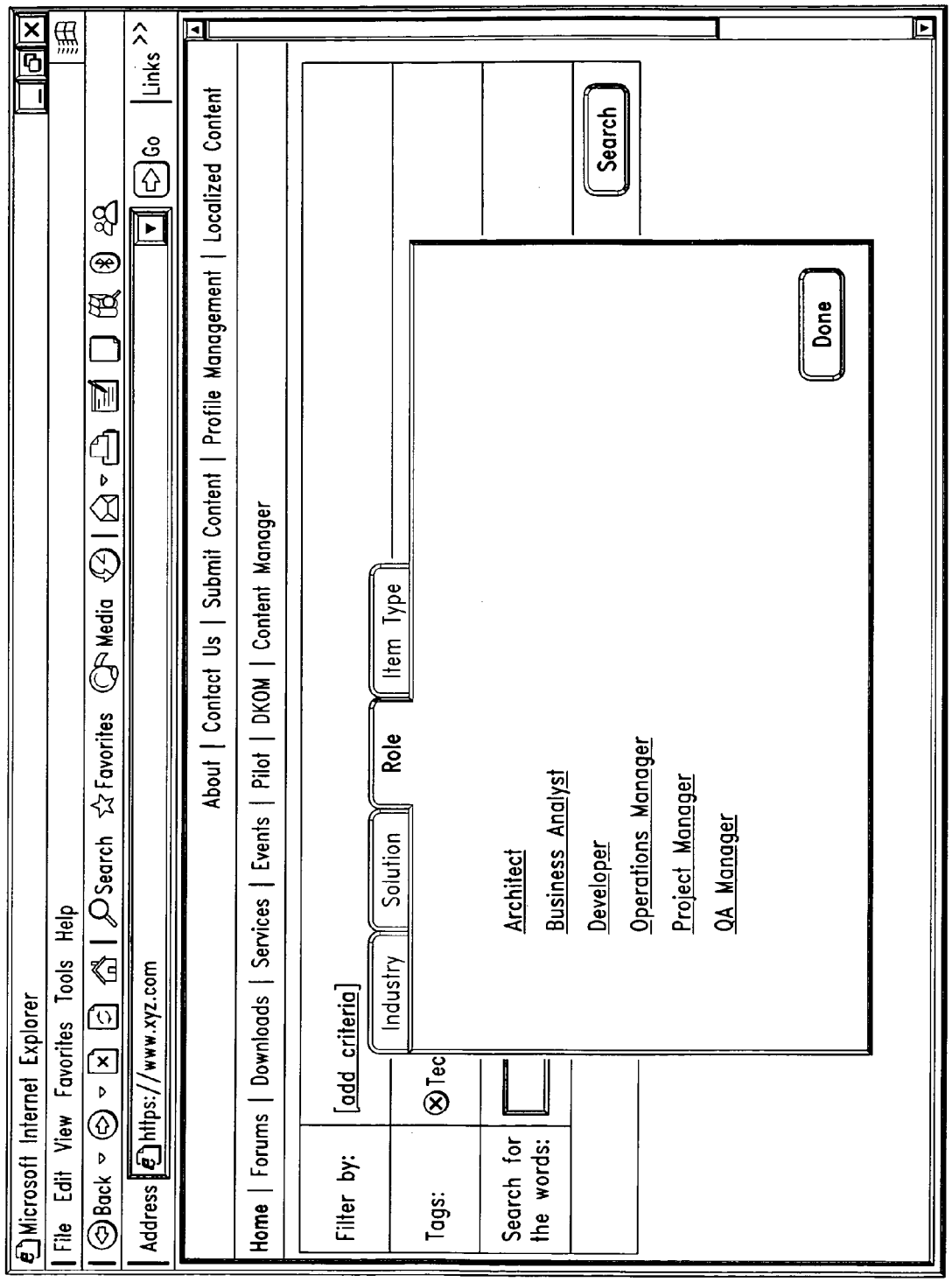
Figure 4E:
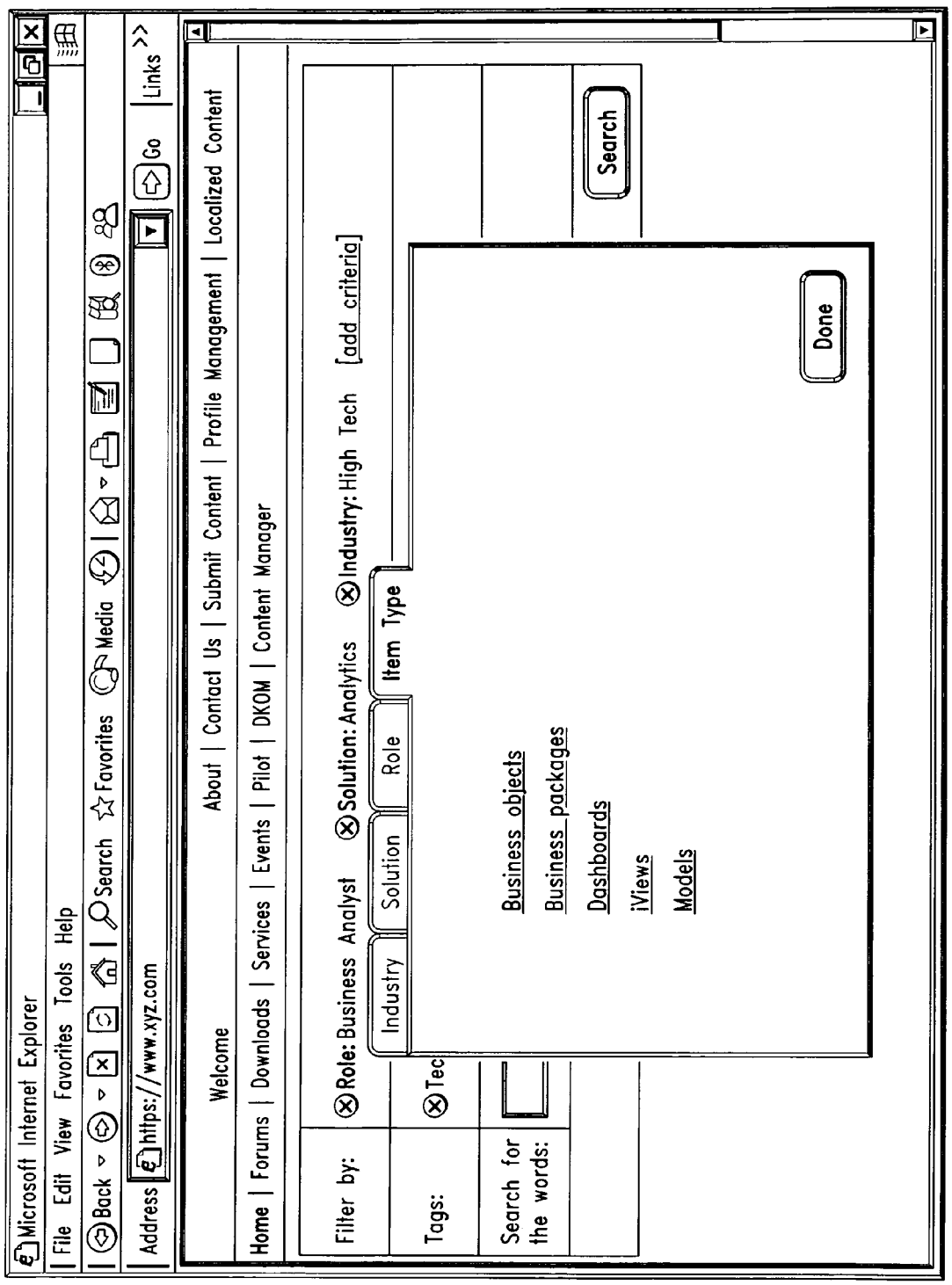
Figure 4F:
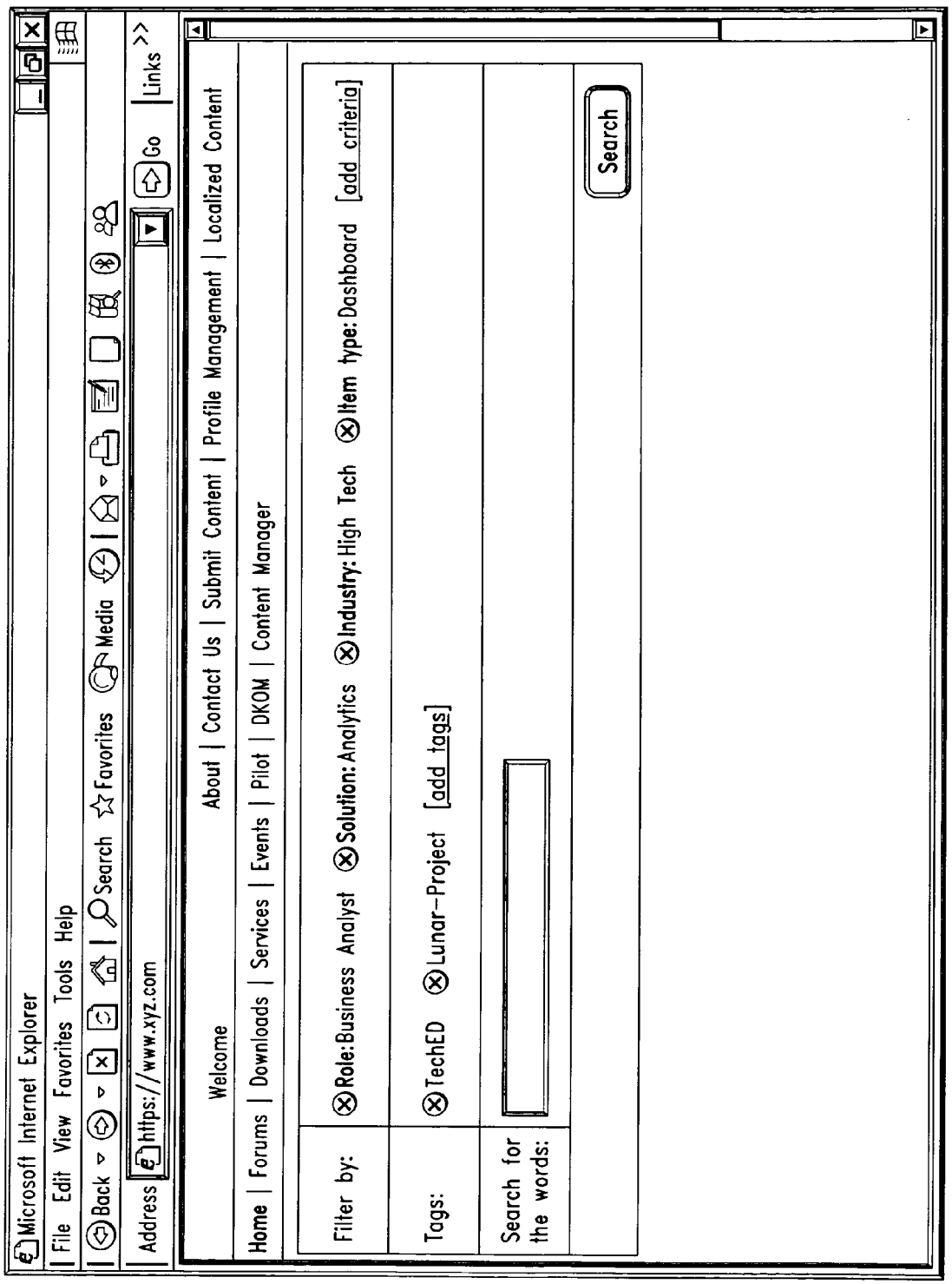
Figure 4G:
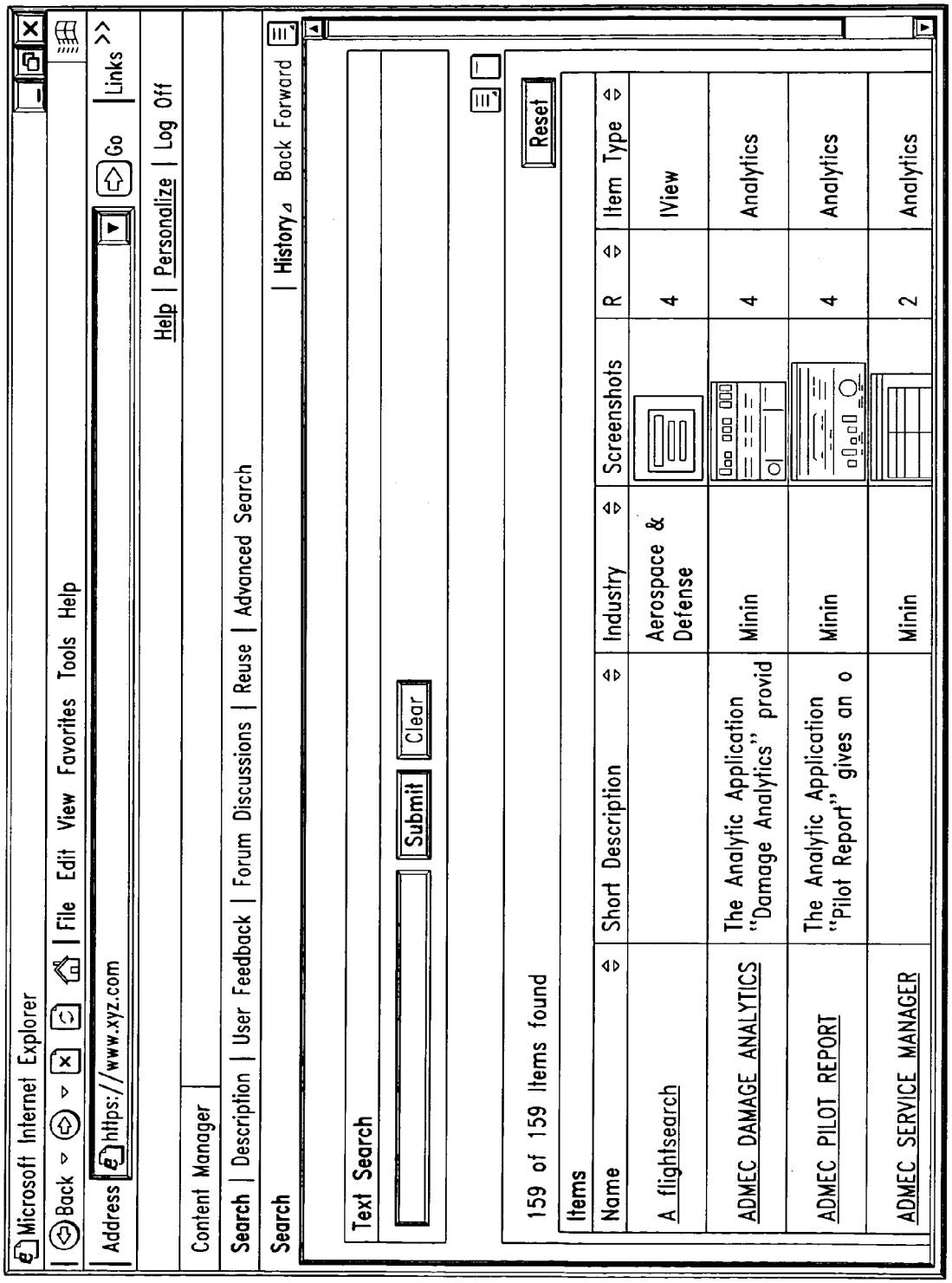
Figure 4H:
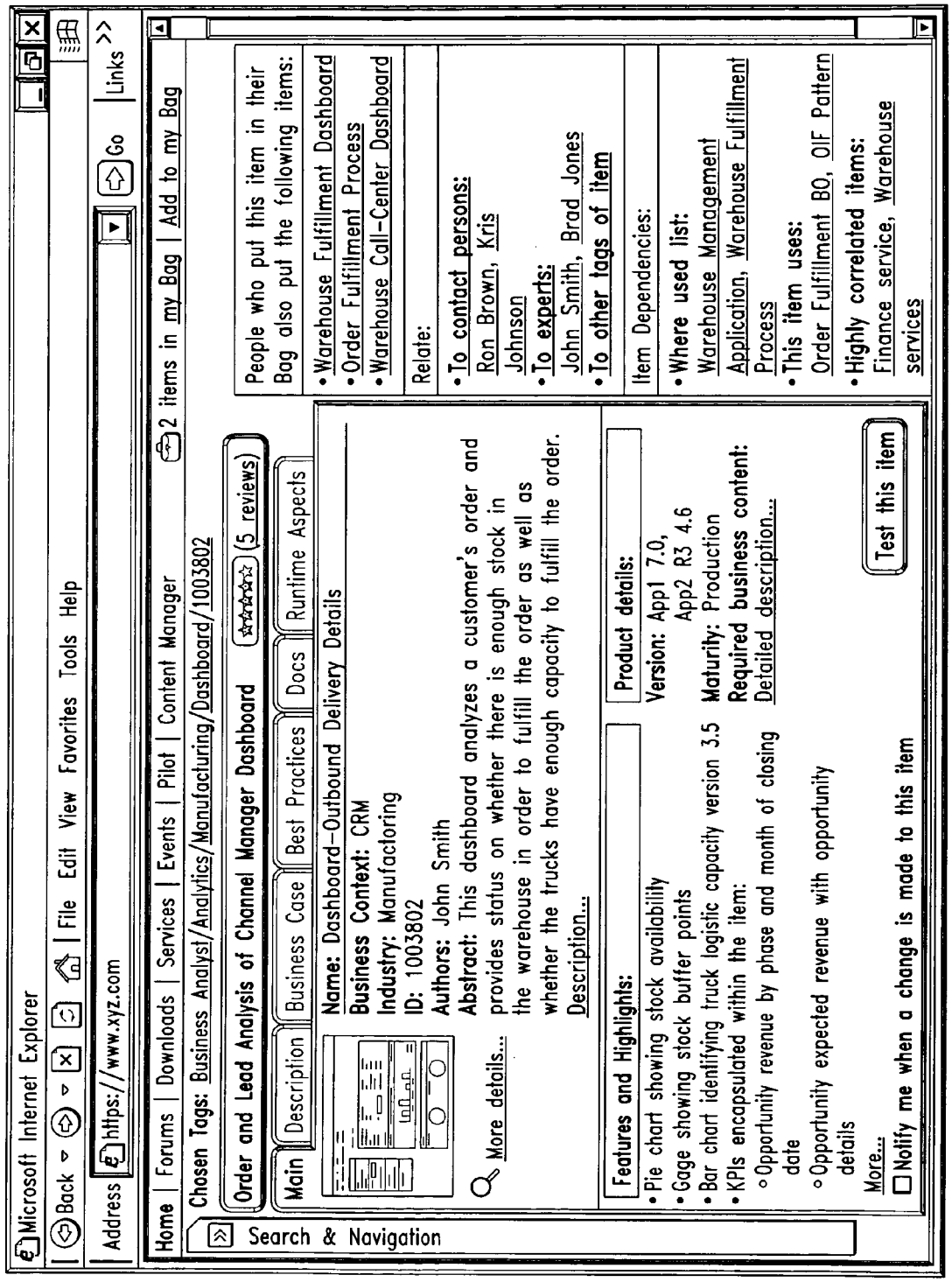
Figure 41:
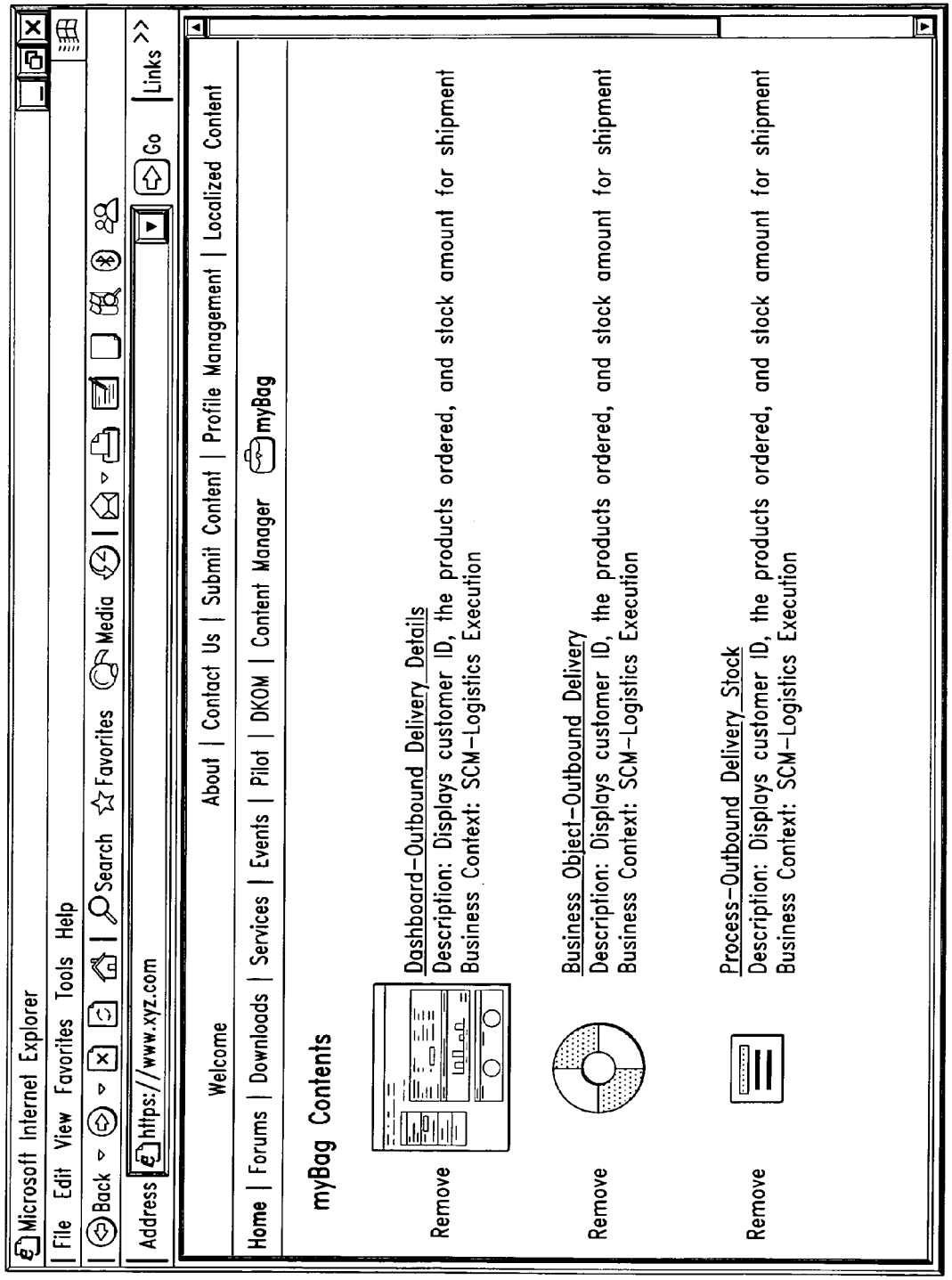
Figure 4J:
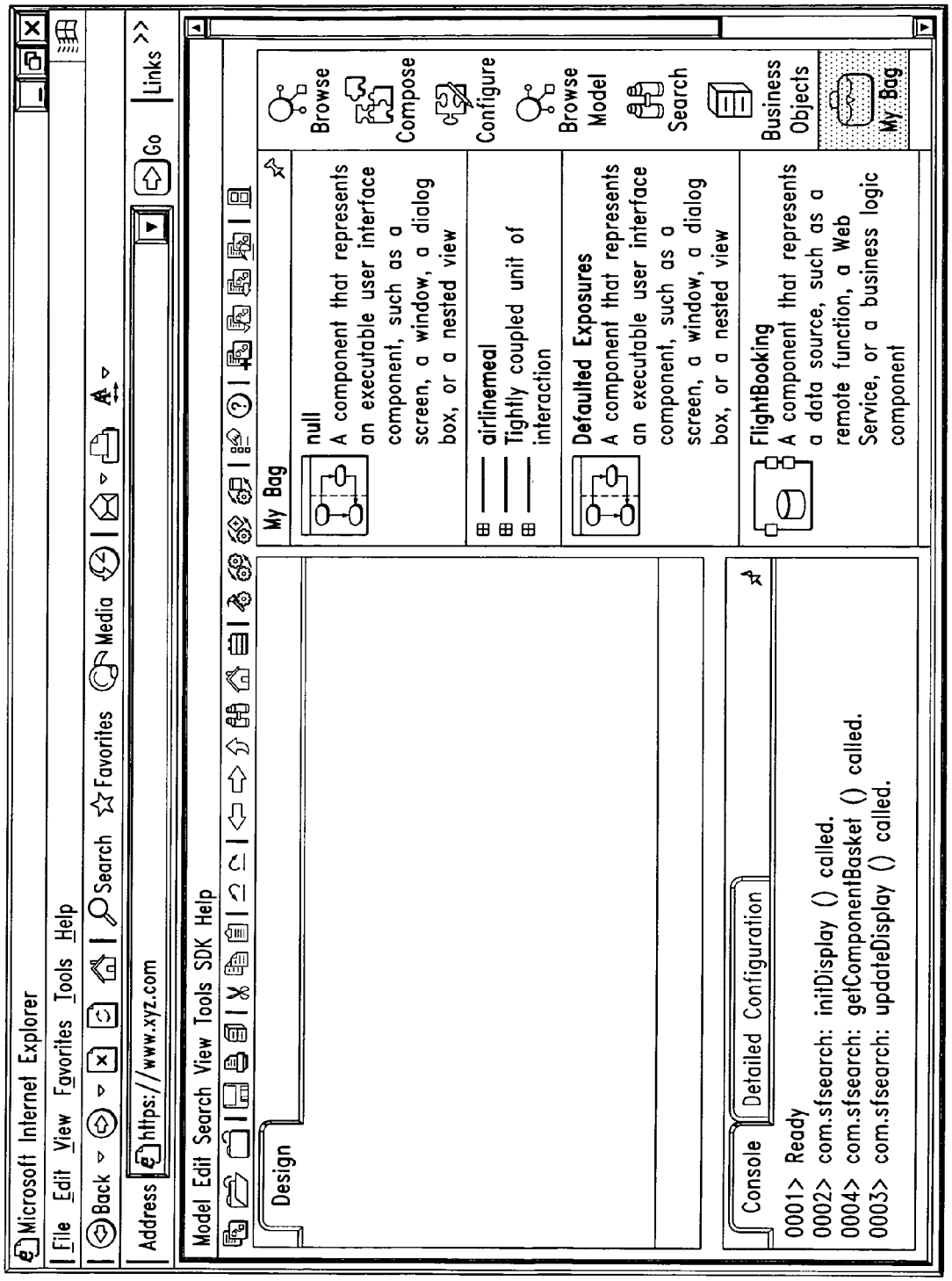

Next, at step 612, the user gets the search's results as shown in interface 136g (FIG. 4G). More specifically, after conducting the search, the user normally gets a clear, easy to understand list of the different items that matched that search. Simply, the user should be able to find the appropriate items from that list, if any. The results may allow the user to view the metadata or accompanying information to understand the component's business scenarios, look and feel, as well as basic technical requirements or recommendations. Such a view may be similar to that illustrated as interface 136h (FIG. 4H). In this example, a screen shot is present along with a name, unique identifier, business context, industry type, author or other content developer 106, general description or abstract, and features and details. In some situations, component manager 130 may provide the user with the legal or licensing setting of consumption of those components. Also, the search results may include the community rating and reviews regarding a specific component 140 and different layouts of the result list, each result displaying information with different look and feel. In some cases, the search results may also display "big name" customers or case histories for appropriate components 140. Further, the results may also be sorted, ranked, or made conspicuous (such as bolded) based on a preferred provider or application indication, contractual obligations, or any other criteria. At this point, the user can also refine the current search, by conducting another search on the items that are presented in the result list.

Figure 4K:
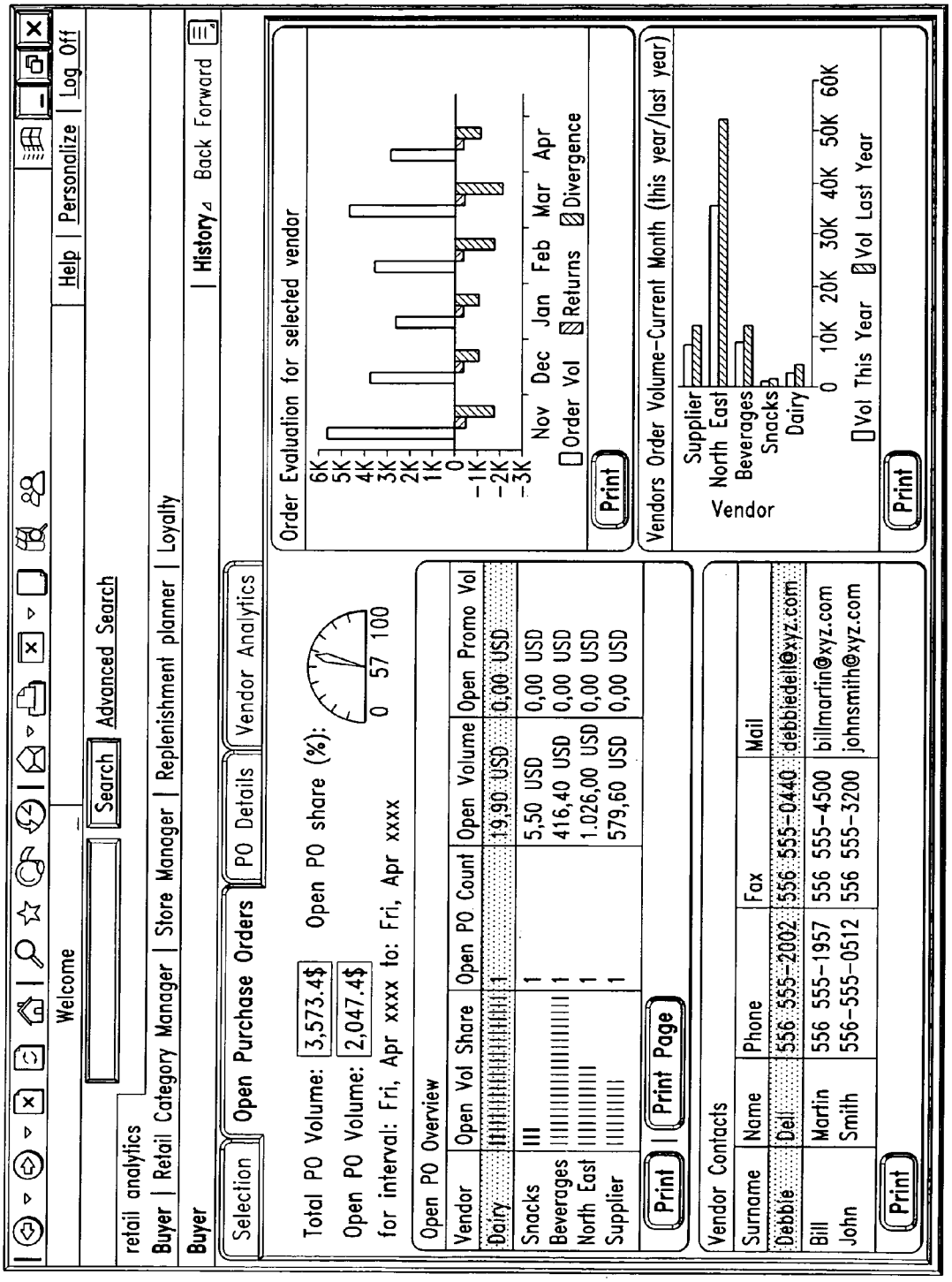

In some cases, the user may be allowed to interact with some of the components 140 in order to help him determine whether the application meets his expectations at step 614. For example, the user can "play" with the application in a runtime system with dummy data ("sandbox") without being bothered with installation and configuration as shown in interface 136k (FIG. 4K). This dummy data may be supplied by content provider 101 or developer 106 or the user can add his own data (if he is granted write abilities). This data can be erased, reinitialized, or otherwise reset when the customer logs off. In another example, component 130 may provide demos with screen shots and audio. In yet another example, the user may download the component 140 for trial and try to work with it in his daily environment within business 108. After examining the different items in the result list, the user may select one or more items from the list at step 616. More specifically, the user can add those selected items to software solutions bag as shown in interface 136i (FIG. 4I). The user can have components for different purposes or solutions in one bag. Moreover, the solutions bag may be user-independent. Put another way, the bag may be associated with the user, a project team, or business 108. Further, the software solutions bag may be interfaced into a variety of different applications. For example, the user may access his associated bag (or bags) via a development tool interface, a web browser, or any other suitable application. At this point, the user may also add notes, remarks, or other metadata for selected components 140. In this way, the user can save the most appropriate items for further investigation of those items, downloading or purchasing them, showing or forwarding them to a colleague, or exiting component manager 130, while allowing the user to get easily return, with as little time and effort as possible. In this way, the aggregated data or components of the bag may allow for easy data access and retrieval.

In certain embodiments, the content provider 101 may bill the user for some or all of the selected components at step 618. The billing amount may be a "finder's fee," an access fee, a search fee, a component cost, or any other suitable cost determined by the user, the business 108, and/or the component 140. Sometimes this billing amount may be computed by component manager 130 and then communicated to the billing application, sub-module, or outside data processing service for subsequent processing. Then, using an EFT process, credit card, business account, or other payment or arranged payment method, content provider 101 receives payment (or approved promise of payment) for the invoiced components 140. Component manager 130 then allows these components to be downloaded by, copied by, or otherwise provided to the requesting user or business 108 at step 622. Of course, if there is no fee or expected billing for the particular selected component, then it may be immediately provided to the user. In fact, if there are no selected components 140 that are associated with a cost, then component manager 130 may automatically skip the billing and payment steps. If the user desires, he may supply feedback and contribute for the community, at step 624, using any forums or modules that help place views, ask questions, and give advice regarding specific applications, components, or enterprise knowledge. This feedback could include notes, ratings, or other comments on the quality of a reusable component. Typically, any registered or authenticated user can take an active part in the forums or execute the feedback functionality. But this feedback could be automatically or manually analyzed—and subsequently filtered or emphasized—based on quality, word choice, performance evaluation of the feedback provider (developer), coding efficiency, role, and such. In some situations, the end user may be encouraged or even required by the content provider 101 to take an active role in the community in order to increase the value it offers to its other members.

FIGS. 7A-B are flowcharts illustrating example methods 700 and 750, respectively, for processing user customizations and requests using system. In some circumstances, these customizations may be made to development components 140 found or selected using a technique similar to that in method 600. Generally, method 700 describes a technique for presenting an optimized customization process to the consumer and method 750 involves a technique for processing a customization request from such a consumer. Method 700 begins at step 702, where the user has identified a particular development component 140. Based on this identification, component manager 130 identifies one or more consultants that are capable, available, or otherwise associated with this particular component at step 704. These consultants may be internal employees or consultants to content provider 101, an agent of the same or other content developer 106, or employee of some other third party (as well as an individual). For example, component manager 130 may identify consultants that are qualified or certified in the particular industry. In another example, component manager 130 may select a consulting company based on contractual agreements for the component types. In a further example, component manager 130 may select consultants based on rates, geography, availability, group or professional memberships, feedback or rating, and/or any other suitable criteria (including no selection criteria). Once the list of appropriate consultants has been gathered, it may be prioritized according to the selection criteria or other criteria (such as screen resolution of the user) at step 706. At least a portion of this prioritized list is then presented to the user at step 708. Occasionally, this list may be presented to the user along with the metadata associated with component 140 in interface 136h. If the user makes a selection of the one the consultants at step 710, then system 100 may automatically communicate a notification of such a selection at step 712. For example, component manager 130 may send an email, an automatically generated letter, an agreement, a statement of work, or any other suitable notice. In this described situation, the consultant is then free to contact the user to request additional information, provide deliverables, or for any other reason using any suitable communication channel, including the storefront community.

Turning to FIG. 7B, example method 750 begins with the searching user requesting a customization to a particular component 140 at step 752. For example, the user would be able to provide feedback directly on the user interface that will help the developer or consultant to adapt and configure the component. This feedback could be the addition of metadata to the search page, tagging during the "sandbox" demonstration, an email indicating the requested changes, or any other suitable communication. More specifically, method 750 may involve graphically layering user requests on top of the application he is viewing. This often helps the user communicate more effectively with the implementer (business analyst or developer) that will manage or make the changes. In this way, content provider 101 could help enable the end user to provide feedback in the context of changes he desires. For example, the user could be previewing the selected component 140 via first graphical layer and tagging questions, adaptations, or other customization requests via a second graphical layer. In this example, the users can create support messages or other tags directly in the application in which they are working. In another example, this multi-layered interface may represent a model-driven solution that allows simple drag-and-drop techniques to request or develop pattern-based or freestyle user interfaces and define the flow of data between them. These tags may be implemented using any suitable graphical element including comments, "pin ups," highlights, drop boxes, frames, and many others. Moreover, this multi-layered interface may help facilitate a collaborative environment. This integrated, real-time collaboration might allow users to work together efficiently regardless of where they are located, as well as enable powerful communication that crosses organizational boundaries while enforcing security requirements. In some circumstances, method 750 may be at least partially implemented an end user feedback system or other similar application. At step 754, the component manager 130 may determine if there is an existing Software Licensing Agreement (SLA) involving the component 140 or another agreement, perhaps between the requesting user (or his business 108) and content provider 101. This determination may be performed by querying an internal database storing data on the extent and type of license agreements and/or by requesting information from an external entity such as a database of a particular software company. If there is an existing agreement, then the input generated by the user may serve as an appendix to such an agreement. In other words, component manager 130 generates an appendix based on the received request at step 756. Next, at step 758, this appendix is then presented to the requesting user (or some other person with signing authority for the user or business 108). If the appendix was not approved at decisional step 760, then that is often the end of this customization and an error message may be sent to the user at step 762. But, in some cases, the parties may negotiate changes to the disputed portions, and processing may resume at this point. Once the appendix is approved, the appendix is electronically or physically added (or appended) to the existing agreement at 764.

After the licensing issues (if any) are handled, then component manager 130 may first determine if this customization is an open bid at decisional step 766. For example, the user may place an indicator on the user interface involving the customization and request that interested consultants (perhaps within preset criteria) contact him directly with bids. In another example, the bidding processing may occur within the storefront framework. If this is an open bid, then component manager 130 may automatically send emails or other transmissions for bids at step 768. Otherwise at step 770, the user's customization request is sent to an individual consultant, who may have been selected according the processes similar to those described in method 700.

FIGS. 8A-B are flowcharts illustrating example methods 800 and 850, respectively, for publishing components into the system of FIG. 1. Generally, method 800 is directed towards publishing a particular developed component 140, while method 850 describes an example walkthrough for supplying the associated metadata for the to-be-published component 140. These example techniques could help the respective community easily upload content into the appropriate logical location. Put another way, these methods may implement an automated workflow that will not only route the uploaded or published content so that it can be certified, but can potentially also package and transport the content. Method 800 begins at step 802, where a component publishing or upload request is sent from a user at any client 104. In certain embodiments, this request (or the following verification step) may follow procedures similar to that described in FIG. 8B. For example, the user can request to add or edit an item using a guided procedure. This guided procedure helps specify the associated items, texts, images, test version, and other metadata. Also, the user can specify what user groups would be able to see this requested item. Further, the user may specify a cost for the component 140. In another example, the authorized user may directly upload the content to the particular repository or page. Next, at step 804, the request is verified. For example, the component manager 130 may ensure that certain required information is supplied with the request (or otherwise capable of identification). In another example, the system may ensure that the user has the security privileges to post or publish content to the storefront. In a further example, component manager 130 may compare the type of component with the requested cost. If the cost is outside certain parameters, then the request may be rejected or automatically modified.

Once the request is verified, component manager 130 may present a preview of the development component to the user at step 806. More specifically, the user may see a preview of how the component 140 would look in the catalog. For example, the user can test the item in the same way it will be supported in the catalog and can supply dummy data or modify dummy data defaulted based on the component type. The user can then edit the publication request and its related content or metadata in the preview mode at step 808. After the request is finalized, then the user may indicate that he approves the publication at step 810. When appropriate, the user can specify a requested date for publishing the item and an expiration date. If the user supplies a publication date (as shown at decisional step 814), then component will not normally be published until such a date is reached (as shown at decisional step 816). In short, once appropriate, the development component is approved by the requestor and published at step 818 and made available for other users and businesses to download, purchase, or otherwise review. In some situations, a storefront administrator may approve publication requests prior to actual publication or distribution. For example, the administrator may access a secure interface (separate from or part of the storefront) to see certain pending requests, edit the content, and approve or deny them. Moreover, the administrator can inform the requestor about an item's approval or ask for further information in order to finish the process. This approval process may be automatically initiated according to the cost, contractual obligations, the developer, the number of customizations or bug fixes, or the degree of changes between versions.

Component manager 130 may automatically select the appropriate repository to store the published component based on any suitable criteria or load-balancing algorithm. For example, a first component 140 may be stored in a first repository because of the component type or geography, a second component 140 may be stored in a second repository because the first repository is full or experiencing reduced performance, and a third component 140 may be stored in the second repository, but in a different table, because of the component's associated platform or module type (object, source, etc.). Of course, these are for example purposes only and each component 140 may be stored in the appropriate automatically or manually determined repository. In a further example, component manager 130 may automatically determine that the particular component 140 (or its metadata) has changed at the remote site and automatically update the storefront, as well as potentially propagate the changes to the appropriate customers. For example, component manager 130 may determine that the price, contact information, associated consultant list, or other information has been changed and automatically update the catalog based on the identified changes.

Example method 850 begins at step 852, where component manager 130 initializes a walkthrough of the publication. The guided procedure might be designed to help influence the content type, the publisher, who the target audience is, and so forth. For example, the first step of the walkthrough may be receiving the purported component type such as module of composite application, interactive view, dashboard, and many others at step 854. Part of this process may include verifying that the user made the correct choice. In the event that the user or component manager 130 can not determine a proper component type, the to-be-published component 140 may be assigned an item type of "other," "unknown," or "to be determined." Next, at step 856, the user may identify any accompany items for the to-be-published-component 140. For example, the accompany may be required, optional, recommended, or catalog-specific elements and may include objects, other published or concurrently to-be-published components 140, text, screenshots or other images, metadata, versioning, and many others. The guided procedure then allows the user, perhaps using a predefined list, to specify what user groups would be able to see this component 140. Based on these selections (if any at decisional step 858), the user can then specify different "look and feel" flavors for each or a group of different user groups at step 860. After this (and other not illustrated) metadata is collected, then the metadata is attached, linked, incorporated into, or otherwise associated with the component 140 for use during the publication process at step 862.

FIG. 9 is a flowchart illustrating an example method 900 for versioning components imported, loaded, or otherwise published into the system of FIG. 1. For example, method 900 to may be used to help implement version control, version updates, and life cycle management that help the user search and consume components 140 using the storefront. Illustrated method 900 beings at step 902, where a component 140 (or its metadata) is received for publishing. For example, the component may be published according to procedures to those described above as methods 800 and 850. Next, at step 904, component manager 130 identifies the version of the uploaded component 140. This version identification may occur through an interactive process presented to the user, manual input by the user, or through an automatic versioning procedure implemented by component manager 130. Sometimes, component manager 130 may automatically identify prior versions of the particular component 140 that are stored in one of the repositories as shown at decisional step 906.

If there are any prior versions, then component manager 130 may compute or otherwise determine a delta (or difference set) between the latest published version in the repositories and the current one being processed at step 908. This dynamically determined delta may be analyzed by the user or a consultant of content provider 101 to help add features or other metadata to the product description in the catalog. Further, this delta may be automatically processed and the results included in a drill-down of the current version when it is published, similar to a "red-line." However accomplished, this newly discovered or identified version metadata is associated with the component at step 910. Then, using any suitable technique, this new version (which may be the initial version) is published to the appropriate repository at step 912. Once the component 140 is published, or approved for publication, then component manager 130 may determine if any content developers 106, business 108, consultants, or other users are to be notified of the new version as shown decisional step 914. If so, then component manager 130 (or some other messaging system) may automatically transmit such a notification to authorized users. For example, component manager 130 may generate a user-specific email that describes the new version, the delta, the release or publication date, the location, the cost or fees, or any other information that may be of use to the recipient. While described above in terms of modifications to source or object code, in certain cases the customization may merely include an update to other metadata (beyond version information) or to the testing or recommended data.

FIG. 10 is a flowchart illustrating an example method 1000 for managing metrics associated with the development components 140 presented, selected, or otherwise managed in system 100. At high level, method 1000 involves the receipt, retrieval, or other capture of metrics to further enhance or manage the storefront. Example method 1000 begins at step 1002, where component manager 130 monitors storefront activity. This activity may include procedural, technical, financial, or any other suitable activity. For example, component manager 130 may track customer activity including supplied search parameters, search results, customer feedback, consultants requested or used, response time by the requested developer or consultant, component returns or complaints, customization or adaptation requests, customer regions and industry types, roles, and such. In another example, component manager 130 may examine the technical aspects of the storefront experience including server or repository response time, bandwidth allocation and utilization, computer or repository uptime, security breaches or questionable activity, and others. In a further example, component manager 130 may monitor the popularity of particular components 140, cost changes, payment failures, credit score or Dun & Bradstreet rating of the customer or his business, and such.

At any point (whether concurrently or afterwards), component manager 130 then receives, retrieves, or otherwise captures metrics describing such activity at step 1004. These metrics may be statistics, objects, or any other information that helps system 100 monitor the actual activity. For example, the metrics may first comprise raw data that is then normalized for easier analysis, storage, or other processing. Next, at step 1006, component manager 130 aggregates the metrics as appropriate. In this case, the metrics may be bundled into metric types so that an overall snapshot of the storefront can be determined for that particular level of granularity. For example, the technical metrics may be collected such that the system or network administrator can get a view of the system status. In a more specific example, these technical metrics may be collected or divided into sub-categories such as network status, database or repository status, and so forth. As appropriate, some or all of the metrics may be used to update the storefront interface (or the metadata associated with certain components 140), as shown at step 1008, or any other suitable logic of system 100. This update may include new rankings, rerouting data transfers, updating or resorting consultants, update a marketing page of "big name" customers, and many others.

After the metrics have been captured and optionally aggregated, the metrics may be individually or collectively compared to some dynamic or predetermined threshold at step 1010. Such thresholds may be set by an administrator, a customer, component manager 130, and other appropriate users or modules. If a metric violates a threshold (such as falling beneath or exceeding the relevant threshold) as shown by decisional step 1012, then an administrator (or customer or other user) may automatically be notified, such as via email or other messaging at step 1014. Regardless of the subsequent processing, the captured metrics are often presented to authorized users via a metrics interface. Of course, the metrics interface may not be separate from the storefront, but may instead be a secured frame (or other object such as a popup) embedded in the storefront interface. From this metrics interface, the user may perform or request any appropriate processing of the metrics. For example, the user may request that daily or weekly status reports be generated or some other report be generated "on the fly" as shown at step 1016. Any report may also be automatically transmitted to appropriate recipients via any communications channel at step 1018. In another example, the user may also use the metrics interface to query the metrics. In this case, component manager 130 may automatically retrieve or summarize the search results and present them to the user at step 1020. In yet another example, component manager 130 may determine trends based on regions, countries, industry types, role types, customers, and such using these metrics. As shown at step 1022, these trends may be determined based on user input or criteria that are provided via the metrics interface. Of course, these uses are for example purposes only and the user or system 100 may utilize the metrics as appropriate including monitoring intellectual property compliance, billing customers or partners, manage or enhance a sales or marketing effort, and so forth.

The preceding flowchart and accompanying description illustrate exemplary methods 500-1000. System 100 contemplates using or implementing any suitable technique for performing these and other tasks. It will be understood that these methods are for illustration purposes only and that the described or similar techniques may be performed at any appropriate time, including concurrently, individually, or in combination. For example, the walkthrough procedure of method 850 may be incorporated into the publication procedures of method 800. Indeed, the auto-versioning techniques of method 900 may be used to supplement the publication process. In another example, the storefront interface may be dynamically updated as each metric is captured or analyzed within method 1000 as appropriate. In addition, many of the steps in this flowchart may take place simultaneously and/or in different orders than as shown. Moreover, system 100 may use methods with additional steps, fewer steps, and/or different steps, so long as the methods remain appropriate. For example, if there are a relatively large amount of identified development components 140, such that the identified components 140 may not fit on the user's screen, then component manager 130 may sort or rank the development components 140 to identify a subset to be displayed. In another example, component manager 130 may not compare some of the captured metrics, such as search parameters, to thresholds when not appropriate.

Although this disclosure has been described in terms of certain embodiments and generally associated methods, alterations and permutations of these embodiments and methods will be apparent to those skilled in the art. For example, certain embodiments of system 100 may be a standalone, but networked, client that retrieves local information, identifies the context of the local user, and provides presentation elements associated with remote objects, applications, or other data accessible via the network. Accordingly, the above description of example embodiments does not define or constrain this disclosure. Other changes, substitutions, and alterations are also possible without departing from the spirit and scope of this disclosure.

What is claimed is:

1. A method for utilizing reusable development components comprising:
presenting an interface to a remote user operable to display information for at least a first and a second development component, the first development component of a first type and the second development component of a second type;
allowing the user to update some portion of metadata associated with the first development for a new version of the first development component different from a prior version of the first development component, wherein allowing the user to update some portion of metadata comprises receiving a request from the user for customization of the first development component, and based on the request, updating a licensing agreement associated with the first development component by generating an appendix to the licensing agreement, presenting the appendix to the user for approval, and based on receiving approval from the user, adding the appendix to the licensing agreement; and
versioning the two versions of the first development component to determine a delta between the prior version and the new version, wherein determining the delta includes automatically determining a delta between the prior version and the new version and appending a summary of the delta to the metadata associated with the new version, the delta comprising a set of differences between the two versions,
wherein the first and second development components are associated with an enterprise software environment comprising a plurality of composite business applications, at least one of the composite business applications including an object access layer operable to exchange data with base systems of the enterprise software environment and provide a uniform interface for the business application.

2. The method of claim 1, wherein allowing the user to update some portion of metadata comprises:
receiving the new version of the first development component; and
updating the metadata associated with the prior version to reflect publication of the new version.

3. The method of claim 1, wherein versioning the two versions comprises automatically versioning the two versions.

4. The method of claim 1 further comprising automatically notifying a plurality of authorized users of the new version.

5. The method of claim 1, further comprising automatically notifying a plurality of consultants of the customization request to facilitate a bidding process, at least one of the consultants being an internal resource.

6. The method of claim 1, further comprising:
automatically selecting a plurality of consultants for performing at least part of this customization request;
presenting at least a portion of the selected consultants to the user; and
notifying at least one of the presented consultants of the customization based on a selection by the user.

7. The method of claim 1, the interface comprising a multi-layered interface, the method further comprising presenting a preview of the first development component through a first layer of the interface, and wherein allowing the user to update some portion of metadata comprises receiving a request from the user for customization of the first development component via a second layer of the interface.

8. The method of claim 7, the user able to interactively add a graphical tag to the interface indicating the requested customization.

9. The method of claim 1, wherein allowing the user to update some portion of metadata comprises receiving feedback from the user on the first component via the interface, the feedback graphically linked with a particular portion of the component and the method further comprises presenting the feedback to a plurality of unrelated users.

10. The method of claim 1, further comprising:
receiving a request to publish a new development component; and
identifying that the first development component is an existing prior version of the new development component, wherein the new development component is the new version of the first development component;
wherein allowing the user to update metadata associated with the first development component is in response to the received request.

11. The method of claim 10, wherein the request includes the new development component, and identifying that the first development component is an existing version of the new development component includes searching a plurality of development components stored in at least one repository for a prior version of the new development component.

12. Apparatus comprising a non-transitory and tangible computer readable storage medium including instructions executable by at least one processor for utilizing reusable development components, the computer readable instructions operable when executed by the at least one processor to:
display information for at least a first and a second development component to a user via a user interface, the first development component of a first type and the second development component of a second type;
allow the user to update some portion of metadata associated with the first development component for a new version of the first development component different from a prior version of the first development component, wherein allowing the user to update some portion of metadata comprises receiving a request from the user for customization of the first development component, and based on the request, updating a licensing agreement associated with the first development component by generating an appendix to the licensing agreement, presenting the appendix to the user for approval, and based on receiving approval from the user, adding the appendix to the licensing agreement; and
version the two versions of the first development component to determine a delta between the prior version and the new version, wherein determining the delta includes automatically determining a delta between the prior version and the new version and appending a summary of the delta to the metadata associated with the new version, the delta comprising a set of differences between the two versions,
wherein the first and second development components are associated with an enterprise software environment comprising a plurality of composite business applications, at least one of the composite business applications including an object access layer operable to exchange data with base systems of the enterprise software environment and provide a uniform interface for the business application.

13. The apparatus of claim 12, wherein allowing the user to update some portion of metadata comprises:
receiving the new version of the first development component; and
updating the metadata associated with the prior version to reflect publication of the new version.

14. The apparatus of claim 12, wherein versioning the two versions comprises the software operable to automatically version the two versions.

15. The apparatus of claim 12, wherein the instructions are further operable, when executed by the at least one processor to automatically notify a plurality of authorized users of the new version.

16. The apparatus of claim 12, wherein the instructions are further operable, when executed by the at least one processor to automatically notify a plurality of consultants of the customization request to facilitate a bidding process, at least one of the consultants being an internal resource.

17. The apparatus of claim 12, wherein the instructions are further operable, when executed by the at least one processor to:
automatically select a plurality of consultants for performing at least part of this customization request;
present at least a portion of the selected consultants to the user; and
notify at least one of the presented consultants of the customization based on a selection by the user.

18. The apparatus of claim 12, the interface comprising a multi-layered interface, the software further operable to present a preview of the first development component through a first layer of the interface, and wherein allowing the user to update some portion of metadata comprises receiving a request from the user for customization of the first development component via a second layer of the interface.

19. The apparatus of claim 18, the user able to interactively add a graphical tag to the interface indicating the requested customization.

20. The apparatus of claim 12, wherein allowing the user to update some portion of metadata comprises the software operable to receive feedback from the user on the first component via the interface, the feedback graphically linked with a particular portion of the component and the method further comprises presenting the feedback to a plurality of unrelated users.

* * * * *